(12) United States Patent
Mihara

(10) Patent No.: US 11,573,758 B2
(45) Date of Patent: Feb. 7, 2023

(54) DISPLAY DEVICE AND MULTI-DISPLAY SYSTEM

(71) Applicant: NEC Display Solutions, Ltd., Tokyo (JP)

(72) Inventor: Tomohiro Mihara, Tokyo (JP)

(73) Assignee: SHARP NEC DISPLAY SOLUTIONS, LTD., Tokyo (JP)

(*) Notice: Subject to any disclaimer, the term of this patent is extended or adjusted under 35 U.S.C. 154(b) by 0 days.

(21) Appl. No.: 16/975,977

(22) PCT Filed: Mar. 14, 2019

(86) PCT No.: PCT/JP2019/010532
§ 371 (c)(1),
(2) Date: Aug. 26, 2020

(87) PCT Pub. No.: WO2019/177095
PCT Pub. Date: Sep. 19, 2019

(65) Prior Publication Data
US 2021/0042081 A1  Feb. 11, 2021

(51) Int. Cl.
G06F 3/14  (2006.01)
G09G 5/12  (2006.01)
G09G 5/14  (2006.01)

(52) U.S. Cl.
CPC .............. *G06F 3/1446* (2013.01); *G09G 5/12* (2013.01); *G09G 5/14* (2013.01); *G09G 2310/08* (2013.01);
(Continued)

(58) Field of Classification Search
CPC ........ G09G 5/14; G09G 5/12; G09G 2370/00; G09G 2310/08; G09G 2360/12
See application file for complete search history.

(56) References Cited

U.S. PATENT DOCUMENTS

| 5,321,750 A | 6/1994 | Nadan |
| 2009/0094658 A1 | 4/2009 | Kobayashi |

(Continued)

FOREIGN PATENT DOCUMENTS

| CN | 1393009 A | 1/2003 |
| CN | 202422700 U | 9/2012 |

(Continued)

OTHER PUBLICATIONS

International Search Report (ISR) (PCT Form PCT/ISA/210), in PCT/JP2018/010200, dated May 29, 2018.

(Continued)

*Primary Examiner* — Shaheda A Abdin
(74) *Attorney, Agent, or Firm* — McGinn IP Law Group, PLLC

(57) ABSTRACT

A display device includes: a video playback unit configured to play video media including multiple frames; a first memory unit configured to store a video signal of the video media that is being played; an acquisition unit configured to acquire a readout control signal representing a readout timing for playing each frame in the video media in a first display device different from an own display device in a multi-display system formed from multiple display devices; a readout control unit configured to cause frames of the video signal corresponding to the readout controls signal to be sequentially read out from the first memory unit in accordance with the acquired readout control signal; and a display control circuit configured to display, on a display unit, the frames of the video signal that have been read out.

20 Claims, 20 Drawing Sheets

(52) U.S. Cl.
CPC ..... *G09G 2360/12* (2013.01); *G09G 2370/00* (2013.01)

(56) References Cited

U.S. PATENT DOCUMENTS

| | | | | |
|---|---|---|---|---|
| 2014/0111530 | A1* | 4/2014 | Choi | G06F 12/00 345/545 |
| 2015/0187333 | A1 | 7/2015 | Loeffler et al. | |
| 2015/0340009 | A1* | 11/2015 | Loeffler | G06F 3/1446 345/1.3 |
| 2018/0046424 | A1 | 2/2018 | Jp et al. | |

FOREIGN PATENT DOCUMENTS

| | | |
|---|---|---|
| CN | 103188509 A | 7/2013 |
| CN | 105516632 A | 4/2016 |
| JP | 2001-117544 A | 4/2001 |
| JP | 2004-347739 A | 12/2004 |
| JP | 2005-134705 A | 5/2005 |
| JP | 2008-051848 A | 3/2008 |
| JP | 2010-156846 A | 7/2010 |
| JP | 4698139 B2 | 6/2011 |
| JP | 2012-078393 A | 4/2012 |
| JP | 2012-124759 A | 6/2012 |
| JP | 2017-016041 A | 1/2017 |
| KR | 10-2016-0098006 A | 8/2016 |
| WO | WO 2013/190695 A1 | 12/2013 |

OTHER PUBLICATIONS

International Search Report (ISR) (PCT Form PCT/ISA/210), in PCT/JP2019/010532, dated Jun. 11, 2019.
Chinese Office Action dated Aug. 1, 2020, in corresponding Chinese Patent Application No. 201980017281.2, with an English translation thereof.

* cited by examiner

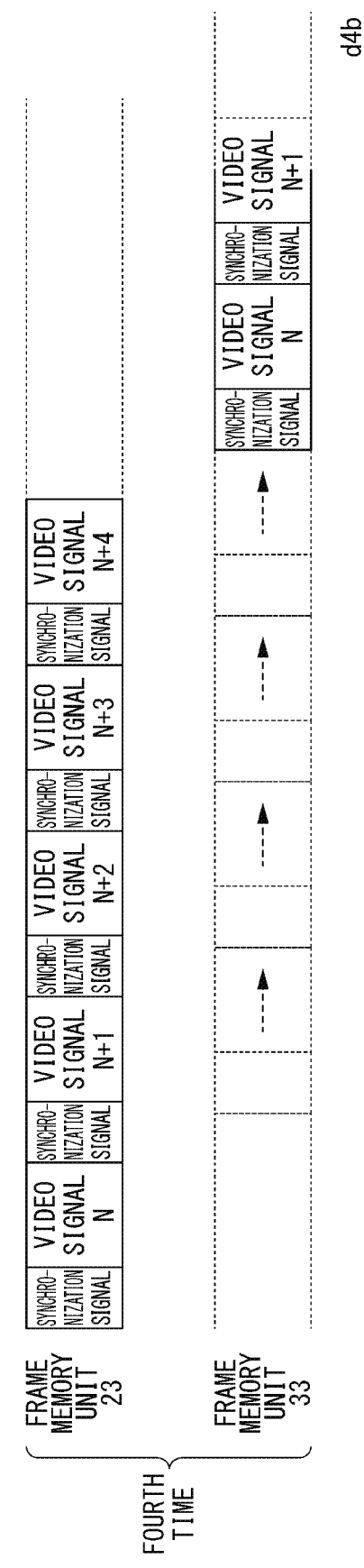

DISPLAY DEVICE AND MULTI-DISPLAY SYSTEM

TECHNICAL FIELD

The present invention relates to a display device and a multi-display system.

The present application claims priority on the basis of PCT/JP2018/010200, filed Mar. 15, 2018, the disclosure of which is incorporated herein by reference.

BACKGROUND ART

There are multi-display systems in which multiple display devices such as projectors and monitors are used, and a single screen to be displayed is divided between and projected by the respective display devices, thereby constructing a single large screen (see, for example, Patent Document 1). Such display devices are, for example, connected in a daisy chain. Furthermore, a video signal is input to a master display device from a video signal supply device for supplying video content. The master display device supplies the video signal to a slave display device that is connected downstream. This video signal is transmitted sequentially to downstream display devices. Then, the multiple display devices each enlarge and display a target area displayed by own display device, in the video signal, thereby displaying a single video signal by means of multiple display devices.

Additionally, display devices include display devices that have a video playback function for playing video media in addition to the function for receiving and displaying video signals from external sources. In such display devices, it is possible to contemplate storing, as video media, the area of a video signal assigned to each own display device, and displaying the area at the original size. In this case, the video signals can be generated in the respective display devices without being sent through daisy chained signal lines. Thus, the video signals can be prevented from deteriorating. Additionally, there is the merit of not needing to perform an enlargement process.

CITATION LIST

Patent Literature

[Patent Document 1]
Japanese Patent No. 4698139

SUMMARY OF INVENTION

Problem to be Solved by the Invention

However, when using the screens of the respective display devices forming a multi-display to display a single screen of content, there is the problem that, if video signals are separately played by the video playback functions of the respective display devices, then the display timings in the respective display devices may not be synchronized.

Means for Solving the Problem

According to one aspect of the present invention, a display device includes: a first memory unit configured to store a video signal input from a video playback device; an acquisition unit configured to acquire a readout control signal, indicating a readout timing, output with a period within one frame constituting the video signal, from a first display device different from an own display device in a multi-display system formed from multiple display devices; a readout control unit configured to cause the video signal to be read out from the first memory unit in accordance with the timing; and a display unit configured to display video based on the video signal read out from the first memory unit.

According to one aspect of the present invention, a display device includes: a memory unit configured to store a video signal input from a video playback device; an output unit configured to output, to another display device, with a period within one frame, a readout control signal indicating a timing for reading out a frame constituting a video signal in an own display device in a multi-display system formed from multiple display devices; a readout control unit configured to cause a video signal corresponding to the readout control signal to be read out from the first memory unit in accordance with the readout control signal; and a display unit configured to display the read-out video signal.

According to one aspect of the present invention, a display device includes: a first memory unit configured to store a video signal input from a video playback device; a second memory unit configured to store a video signal corresponding to the video playback device, the video signal being input from a first display device different from an own display device in a multi-display system formed from multiple display devices; a comparison unit configured to compare, frame by frame, the video signal read out from the first memory unit and the video signal read out from the second memory unit; a readout control unit configured to cause the video signal input from the video playback device, stored in the first memory unit, to be read out based on a comparison result in the comparison unit; and a display unit configured to display video based on the video signal read out from the first memory unit.

According to one aspect of the present invention, a multi-display system includes: a first display device having a first memory unit configured to store a video signal input from a video playback device, an output unit configured to output, to another display device, with a period within one frame, a readout control signal indicating a timing for reading out a frame constituting a video signal in an own first display device in the multi-display system formed from multiple display devices, a readout control unit configured to cause a video signal corresponding to the readout control signal to be read out from the first memory unit in accordance with the readout control signal, and a display unit configured to display the read-out video signal; and a second display device having a second memory unit configured to store a video signal corresponding to the video signal input from the first display device, a third memory unit configured to store a video signal input from a video playback device connected to an own second display device, an acquisition unit configured to acquire a readout control signal, indicating a readout timing, output with a period within one frame constituting the video signal, from the first display device, a readout control unit configured to cause a video signal corresponding to the readout control signal to be read out from the third memory unit in accordance with the acquired readout control signal, and a display unit configured to display video based on the video signal read out from the third memory unit.

According to one aspect of the present invention, a display method includes: storing, by a first memory unit, a video signal input from a video playback device; acquiring, by an acquisition unit, a readout control signal, indicating a readout timing, output with a period within one frame constituting the video signal, from a first display device different from an own display device in a multi-display system formed from multiple display devices; causing, by a readout control unit, the video signal to be read out from the first memory unit in accordance with the timing; and displaying, by a display unit, video based on the video signal read out from the first memory unit.

According to one embodiment of the present invention, a display method includes: storing, by a memory unit, a video signal input from a video playback device; outputting, by an output unit, to another display device, with a period within one frame, a readout control signal indicating a timing for reading out a frame constituting a video signal in an own display device in a multi-display system formed from multiple display devices; causing, by a readout control unit, a video signal corresponding to the readout control signal to be read out from the first memory unit in accordance with the readout control signal; and displaying, by a display unit, the read-out video signal.

According to one aspect of the present invention, a display method includes: storing, by a first memory unit, a video signal input from a video playback device; storing, by a second memory unit, a video signal corresponding to the video playback device, the video signal being input from a first display device different from an own display device in a multi-display system formed from multiple display devices; comparing, by a comparison unit, frame by frame, the video signal read out from the first memory unit and the video signal read out from the second memory unit; causing, by a readout control unit, the video signal input from the video playback device stored in the first memory unit to be read out based on a comparison result in the comparison unit.

Advantageous Effects of Invention

According to the present invention, even when video signals are played separately by means of the video playback functions of the respective display devices forming a multi-display, the video signals can be displayed with the display timing synchronized in the respective display devices.

BRIEF DESCRIPTION OF DRAWINGS

FIG. 14C is a diagram illustrating the relationship between the frames, respectively, in the frame memory unit 23 and the frame memory unit 33.

DESCRIPTION OF EMBODIMENTS

Figure 1:
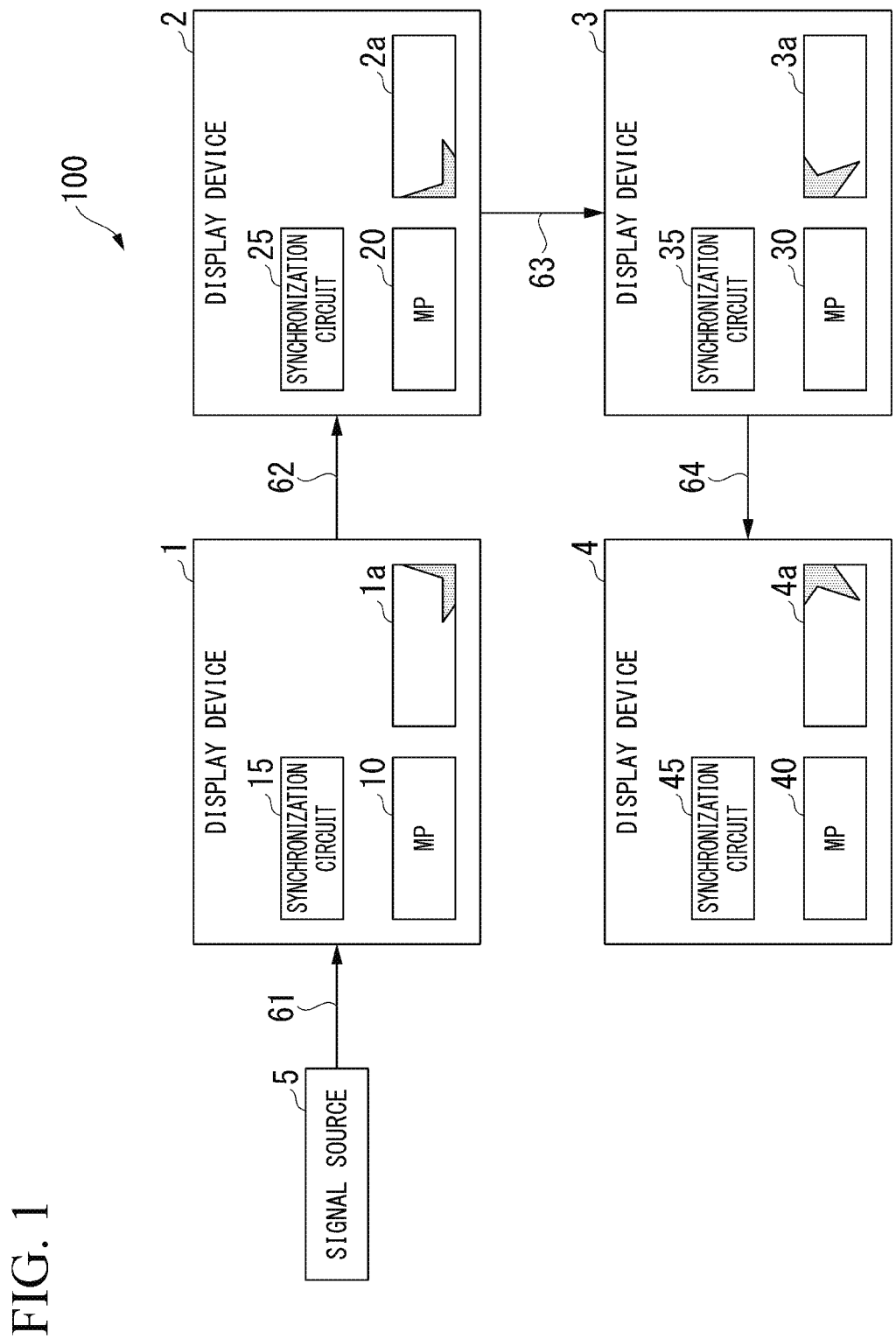
FIG. 1 is a schematic structural diagram illustrating the structure of a multi-display system 100 according to a first embodiment of the present invention.

Hereinafter, a display system 1 according to an embodiment of the present invention will be explained with reference to the drawings. FIG. 1 is a schematic structural diagram illustrating the structure of a multi-display system 100 according to a first embodiment of the present invention.

The multi-display system 100 has a display device 1, a display device 2, a display device 3 and a display device 4 that are daisy chained by means of video signal lines. Additionally, in this multi-display system 100, a signal source 5 is connected to the display device 1. The signal source 5 is a device for supplying a video signal and may, for example, be a computer, a video playback device or the like. The signal source 5 is electrically connected to the display device 1 by means of a video signal line 61. The signal source 5 outputs video signals to the display device 1 by means of the video signal line 61.

The display device 1 is connected to the display device 2 via the video signal line 62. The display device 2 is connected to the display device 3 via the video signal line 63. The display device 3 is connected to the display device 4 via the video signal line 64.

In this way, the signal source 5, the display device 1, the display device 2, the display device 3 and the display device 4 are daisy chained by the video signal line 61, the video signal line 62, the video signal line 63 and the video signal line 64.

Figure 2:
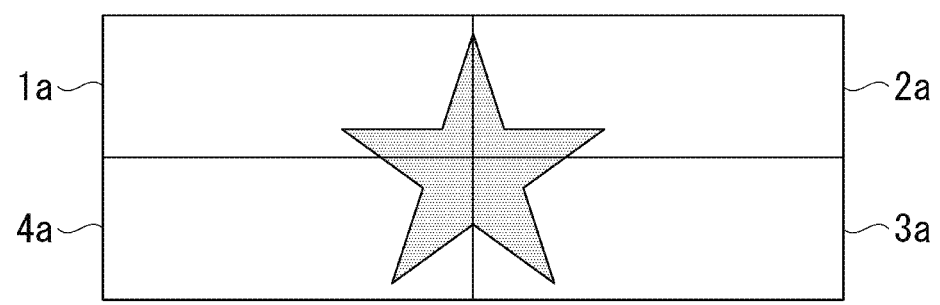
FIG. 2 is a diagram illustrating an example of an image displayed on the multi-display system 100.

In this case, the display device 1, the display device 2, the display device 3 and the display device 4 are each provided with a media player (hereinafter also referred to as an MP) and a synchronization circuit. The display device 1 is provided with an MP 10 and a synchronization circuit 15, the display device 2 is provided with an MP 20 and a synchronization circuit 25, the display device 3 is provided with an MP 30 and a synchronization circuit 35, and the display device 4 is provided with an MP 40 and a synchronization circuit 45. The MP 10, the MP 20, the MP 30 and the MP 40 play video media so that a single video is played on the four display screens of the display device 1, the display device 2, the display device 3 and the display device 4. In this case, when a display image 1a is displayed on the display device 1, a display image 2d is displayed on the display device 2, a display image 3a is displayed on the display device 3, and a display image 4a is displayed on the display device 4, these display images are combined to be displayed as a single video as illustrated in FIG. 2.

Additionally, in this case, when displaying the images as a single video, the timing by which the display images are displayed on the display devices must be synchronized. The synchronization circuit 15 in the display device 1, the synchronization circuit 25 in the display device 2, the synchronization circuit 35 in the display device 3 and the synchronization circuit 45 in the display device 4 have the function of synchronizing the timing by which the display images are displayed with the other display devices. By synchronizing the display timing in this way, even if different video media are separately played in the respective display devices, they will be displayed so as to form a single video on the entire multi-display system 100.

When the video media is played on the MPs (MP 10, MP 20, MP 30 and MP 40), the signal source 5 does not need to supply a video signal to the display device 1. In this case, the video signal does not need to be supplied from the signal source 5 to the display device 1 via the video signal line 61. Meanwhile, the video signal line 62, the video signal line 63 and the video signal line 64 are connected between the respective display devices in order to form the daisy chain connection when constructing the multi-display system 100. Thus, the present embodiment makes use of the video signal line 62, the video signal line 63 and the video signal line 64.

Figure 3:
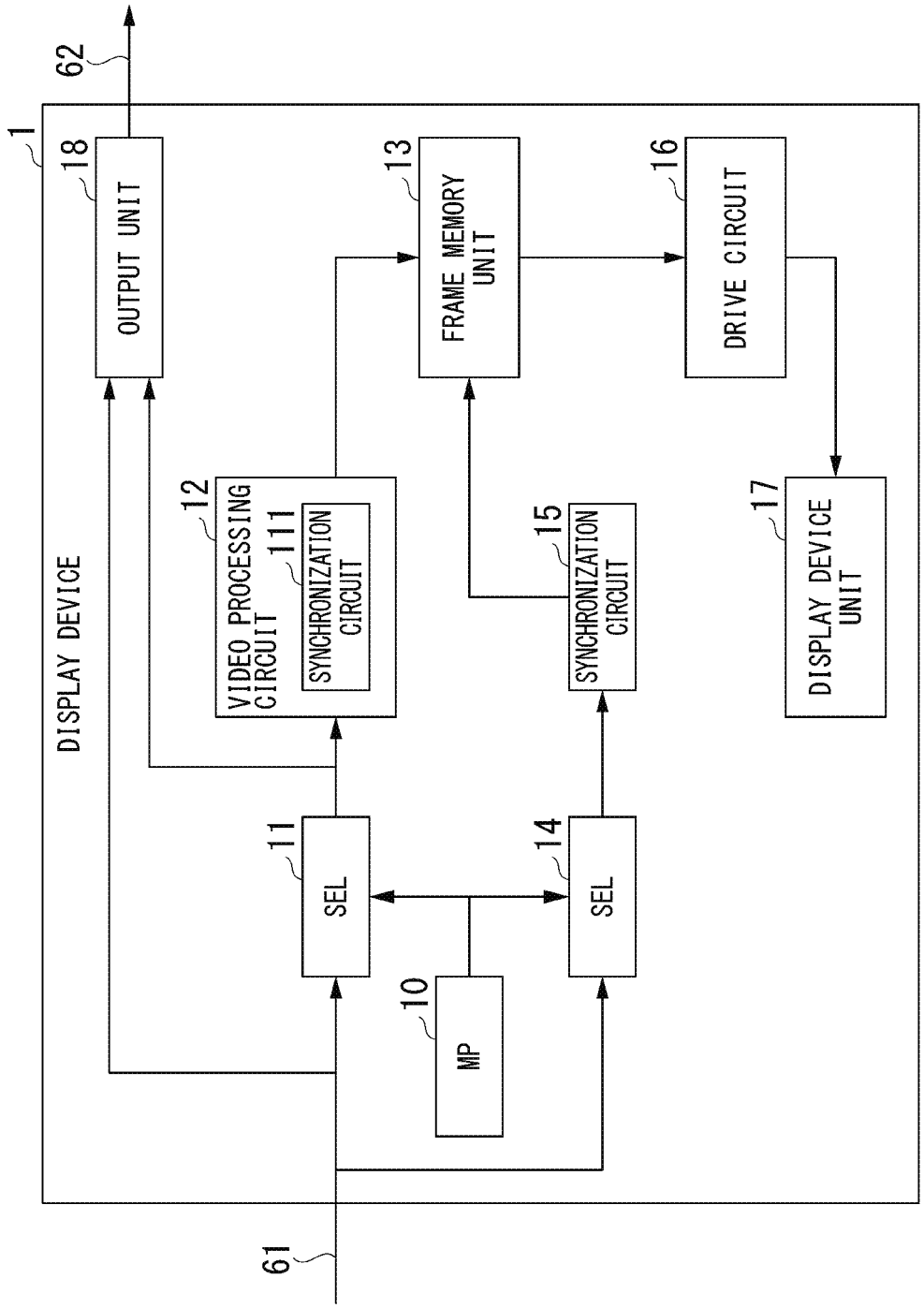
FIG. 3 is a schematic functional block diagram for explaining the functions of a display device 1.

FIG. 3 is a schematic functional block diagram for explaining the functions of the display device 1.

The MP 10 plays video media and outputs the played video signal. Video data that is to be generated may be pre-stored in a memory device in the display device 1, or video data that is stored in a recording medium may be read out. Additionally, the MP 10 may perform a function similar to the signal source 5.

A selector (hereinafter also referred to as a SEL) 11 selects either a video signal input from the video signal line 61 or a video signal output from the MP 10, and outputs the selected video signal to the video processing circuit 12 and also to an output unit 18.

Regarding which video signal is to be selected, the SEL 11, for example, acquires instructions from an external source regarding whether the content to be displayed is a video signal from the signal source 5 or a video signal played by the MP 10, and selects the video signal in accordance with those instructions. The instructions from the external source may, for example, be from a remote control device or the like of the display device 1.

The video processing circuit 12 implements processing for writing the video signal input from the SEL 11 into a frame memory unit 13. Additionally, the video processing circuit 12 has a synchronization circuit 111. The synchronization circuit 111 generates various timing signals for writing the video signal into the frame memory unit 13 based on a horizontal synchronization signal or a vertical synchronization signal in the video signal.

The frame memory unit 13 stores the video signal that is written from the video processing circuit 12 and outputs (reads out) the stored video signal to a drive circuit 16.

An SEL 14 selects either the signal supplied from the video signal line 61 or the signal supplied from the MP 10 and outputs the selected signal to the synchronization circuit 15. In this case, among the display devices in the multi-display system 100, if the own display device (display device 1) is the display device that is furthest upstream in the daisy chain (the display device that is connected first to the signal source 5), then the SEL 14 selects the video signal output from the MP 10, and if it is not the display device that is the furthest upstream, then the SEL 14 selects the signal output from the video signal line 61. In this case, the display device 1 is the display device that is the furthest upstream in the daisy chain, so the SEL 14 selects the signal output from the MP 10. Regarding whether or not the own display device is the display device that is the furthest upstream, it is possible to use a control signal to detect whether or not there are display devices connected upstream or downstream from the own display device at the time the display devices are daisy chained to form the multi-display system 100.

In this case, the video signal obtained from the MP 10 need only be a signal from which it is possible to recognize the timing by which the MP 10 is to play the video signal. For example, a timing signal for starting to play a chapter in video media being played by the MP 10, a timing signal for displaying a specific frame of a video when playing video media, or the like are may be used.

The synchronization circuit 15 reads out and outputs a readout control signal for controlling the timing for causing the drive circuit 16 to read out the video signal from the frame memory unit 13, based on the timing signal output from the SEL 14. By reading out a video signal of a frame that is to be read out (a frame that is to be displayed) at a timing in accordance with the timing signal, the synchronization circuit 15 can supply the video signal from the frame memory unit 13 to the drive circuit 16 at a timing in accordance with the readout control signal.

For example, the synchronization circuit 15 generates a readout control signal representing the timing by which a video signal is to be read out from the frame memory unit 13 based on a horizontal synchronization signal or a vertical synchronization signal in the video signal, and outputs the readout control signal to the frame memory unit 13. As this readout control signal, a synchronization signal contained in the video signal may be used. The synchronization signal is a signal representing the timing at which each frame of video media is to be read out. For example, the synchronization signal represents the timing by which each frame of video media is to be sequentially read out at regular intervals.

The drive circuit 16 causes a display device unit 17 to display a video signal that has been read out from the frame memory unit 13 in accordance with the readout control signal. For example, the drive circuit 16 causes the display device unit 17 to draw a video signal by driving the display element of each pixel in the display device unit 17.

The display device unit 17 displays the video signal. This display device unit 17 is, for example, a liquid crystal display panel.

The output unit 18 selects either the video signal input from the SEL 11 or the video signal input from the video signal line 61 and outputs the selected signal to a downstream display device (display device 2) through the video signal line 62. When the SEL 11 selects the video signal from the signal source 5 (when the content to be displayed is the video signal from the signal source 5), the output unit 18 selects the video signal input from the video signal line 61, and when the content to be displayed is the video signal played by the MP 10, the output unit 18 selects the video signal input from the SEL 11. The video signal line 62 is connected to the output terminal of the output unit 18. Thus, the output unit 18 can output, to a display device that is connected downstream, via the daisy chained video signal line, a readout control signal representing the playback timing (for example, the display timing for displaying the video signal of the video media) for playing the video media on the own display device.

Figure 4:
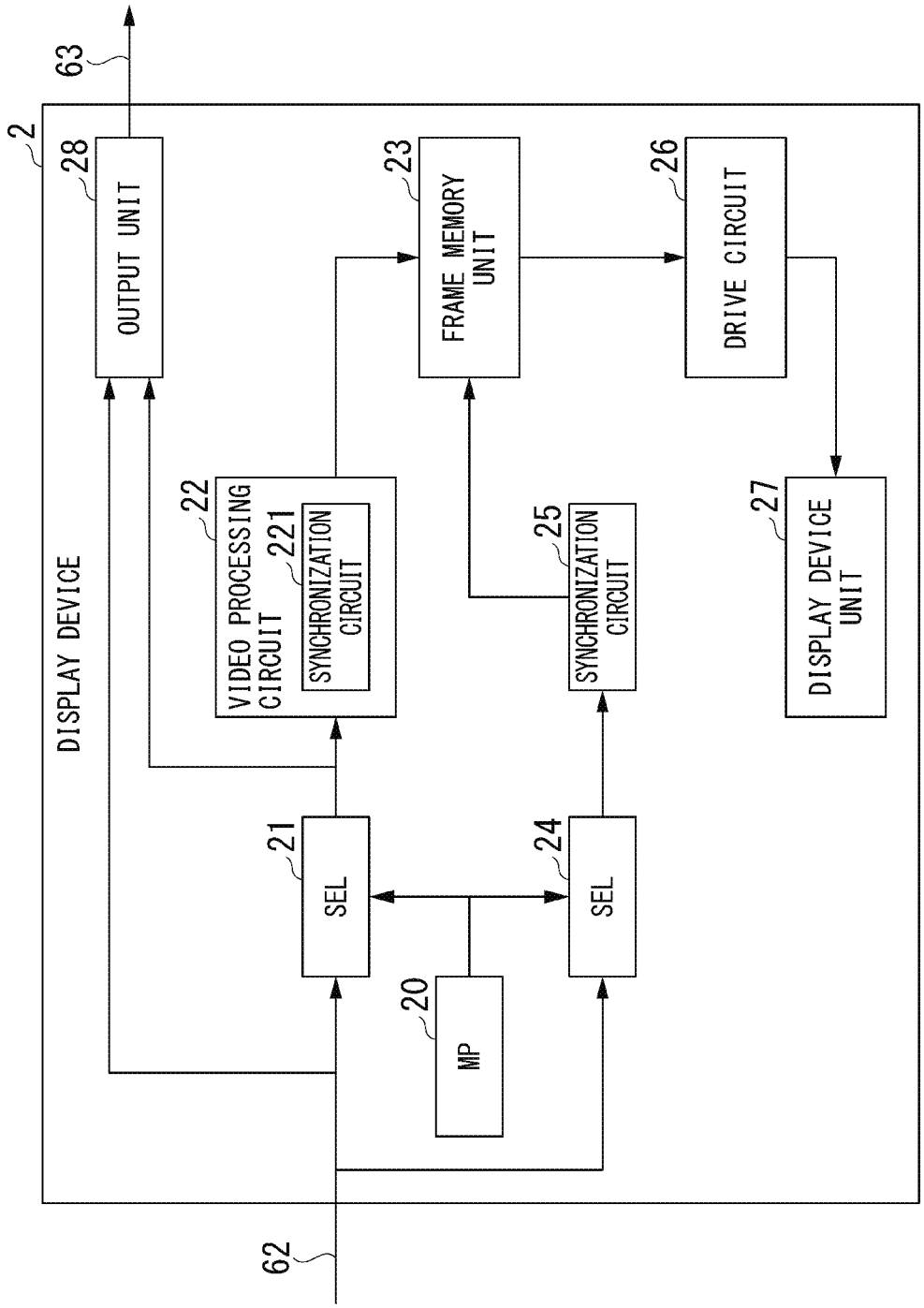
FIG. 4 is a schematic functional block diagram for explaining the functions of a display device 2.

Next, FIG. 4 is a schematic functional block diagram for explaining the functions of the display device 2. Some of the functions of the display device 2 are the same as the functions in the display device 1. The explanations of the same parts will be omitted and the differences will mainly be explained.

The MP 20 plays video media and outputs the video signal being played.

An SEL 21 selects either a video signal input from the video signal line 62 or the video signal input from the MP 20, and outputs the selected video signal to a video processing circuit 22 and also to an output unit 28.

Regarding which video signal is to be selected, for example, the SEL 21 acquires, from an external source, instructions regarding whether the content to be displayed is the video signal from the signal source 5 or the video signal played by the MP 20, and selects the video signal in accordance with those instructions. The instructions from the external source may, for example, be from a remote control device or the like of the display device 1.

A video processing circuit 22 implements processing for writing the video signal input from the SEL 21 into a frame memory unit 23. Additionally, the video processing circuit 22 has a synchronization circuit 211. The synchronization circuit 211 generates various timing signals for writing the video signal into the frame memory unit 13 based on a horizontal synchronization signal or a vertical synchronization signal in the video signal.

The frame memory unit 23 stores video signals that are written from the video processing circuit 12, and outputs (reads out) the stored video signals to a drive circuit 26. Here, the case in which the video processing circuit 22 writes a video signal into the frame memory unit 33 will be explained, but it is also possible for another functional unit (for example, a writing unit) to write a video signal output from the video processing circuit 22 into the frame memory unit 23.

The SEL 24 selects either the video signal supplied from the video signal line 62 or the video signal supplied from the MP 20 and outputs the selected signal to the synchronization circuit 25. Here, among the display devices in the multi-display system 100, if the own display device (display device 2) is the display device that is furthest upstream in the daisy chain, then the SEL 24 selects the signal output from the MP 20, and if it is not the display device that is the furthest upstream, then the SEL 24 selects the signal supplied from the video signal line 62. In this case, the display device 2 is not the display device that is furthest upstream in the daisy chain, so the SEL 24 selects the video signal supplied from the video signal line 62.

In this case, the video signal obtained through the video signal line 62 is the video signal output from the output unit of the display device (the display device 1 in the present case) that is connected upstream.

The synchronization circuit 25 generates a readout control signal representing the timing by which the video signal is to be read out from the frame memory unit 13 based on a horizontal synchronization signal or a vertical synchronization signal in the video signal output from the SEL 24, and outputs the readout control signal to the frame memory unit 23. As a result thereof, the video signal can be supplied from the frame memory unit 23 to the drive circuit 26 at a timing in accordance with the readout control signal.

In this case, the video signal of the video media played by the MP 20 is temporarily stored in the frame memory unit 23, and the timing by which the video signal is read out follows the readout control signal from the synchronization circuit 25, in other words, the readout control signal obtained from the display device connected upstream from the own display device. Thus, the video signal can be read out from the frame memory unit and displayed on the display device unit in the own display device in synchronization with the timing by which a display device that is connected upstream reads out a video signal from a frame memory unit and displays the video signal on a display device unit.

Additionally, in this case, a synchronization signal included in a video signal played on an MP in the display device that is furthest upstream stage in the daisy chain can be supplied to the display devices connected to a stage subsequent to a second stage. Thus, by using, as a readout control signal, a synchronization signal included in the same video signal in the display device that is furthest upstream and in the display devices further downstream than the second display device, the display timings in the respective display devices can be synchronized.

The drive circuit 26 displays, on a display device unit 27, a video signal that has been read out from the frame memory unit 23 in accordance with the readout control signal. The display device unit 27 displays the video signal.

The output unit 28 selects either the video signal input from the SEL 21 or the video signal input from the video signal line 62 and outputs the selected signal to a downstream display device (the display device 3 in this case) through the video signal line 63. When the SEL 21 selects the video signal from the signal source 5 (when the content to be displayed is the video signal from the signal source 5), the output unit 28 selects the video signal input from the SEL 21, and when the content to be displayed is the video signal played by the MP 20, the output unit 28 selects the video signal input from the video signal line 62. The video signal line 63 is connected to the output terminal of the output unit 28. Thus, the output unit 28 can output, to display devices that are connected downstream, via the daisy chained video signal lines, the video signal obtained from the display device that is connected upstream.

By having this output unit 28, in accordance with whether or not the own display device is the display device that is furthest upstream among the multiple daisy chained display devices, it is possible to output, to a downstream display device, either a video signal from the signal source 5 or the video signal played by the MP in the display device that is furthest upstream. Additionally, by using the output unit 28, it is possible to make use of the video signal lines to supply the video signal being played by the MP in the display device that is furthest upstream to each of the display devices connected further downstream than the third display device.

Next, the structures of the display device 3 and the display device 4 are similar to the structure of the display device 2. Regarding the display device 4, a display device is not connected downstream therefrom. Thus, a display device is not connected to the output terminal of the selector of the display device 4.

Additionally, according to the above-described structures, all of the display devices have the same structures in terms of the MP, the two SELs, the output unit, the video processing circuit, the synchronization circuit, the frame memory unit, the drive circuit and the display device unit provided in the display device. For this reason, as long as an instruction is obtained as to whether the video signal from the signal source 5 is to be displayed or the video signal from the MP is to be displayed, the signal can be appropriately selected by the SELs in accordance with whether or not the own display device is the display device that is furthest upstream in the daisy chain. Thus, by preparing and daisy chaining multiple display devices as in FIG. 3 or FIG. 4, it is possible to obtain functions in accordance with whether or not a display device is the display device that is furthest upstream, without performing any special processes.

Figure 5:
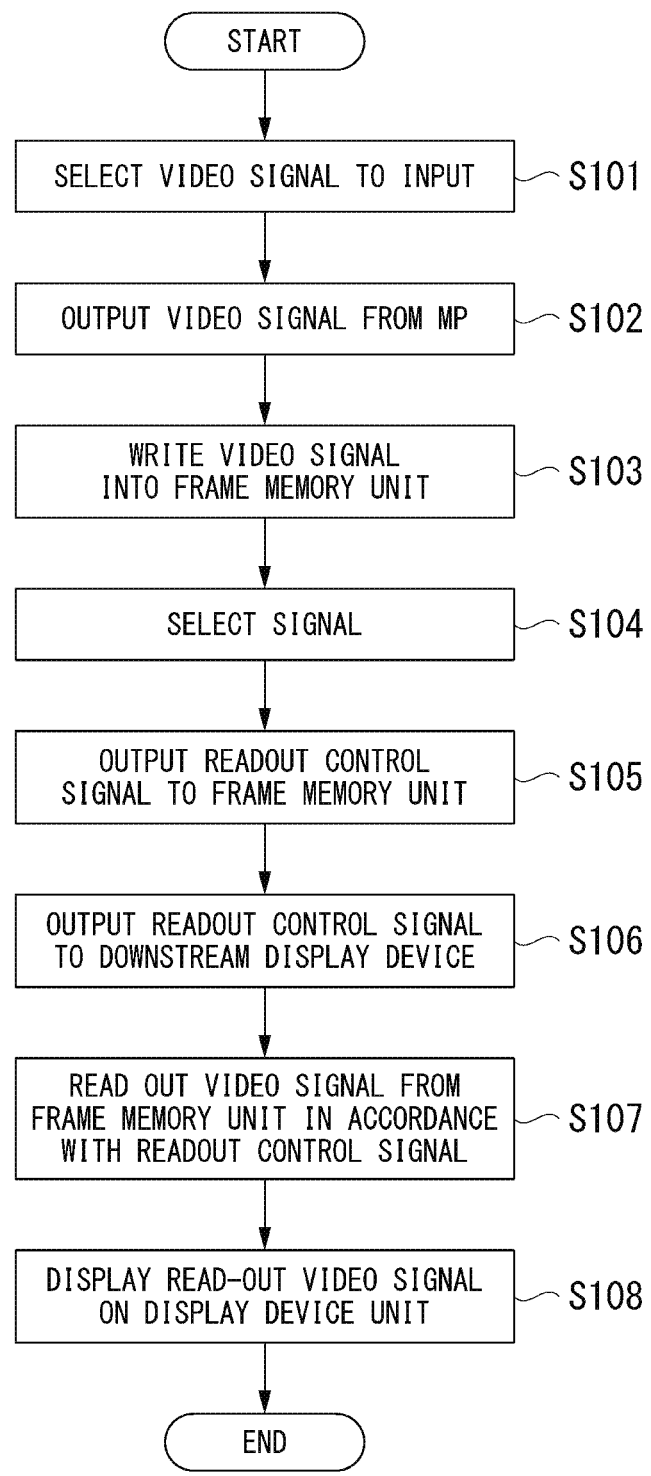
FIG. 5 is a flow chart for explaining the operations in a display device.

Next, the operations of the display device will be explained. FIG. 5 is a flow chart for explaining the operations in the display device.

Each display device, for example, selects a video signal in accordance with instructions from an external device such as a remote control device or an input switching button or the like provided in the display device (step S101). In this case, the video signal from the MP is selected.

Each MP outputs a video signal to the video processing circuit by playing video media (step S102). The video processing circuit writes the video signal into the frame memory unit (step S103).

Meanwhile, the SEL selects either a signal supplied from a video signal line or the signal supplied from the MP (step S104). In this case, if the own display device is the display device that is furthest upstream, then the SEL 14 selects the signal output from the MP 10. If the own display device is not the display device that is furthest upstream, for example, if the own display device is the display device 2, then the SEL 24 selects the video signal supplied from the video signal line 61.

In step S104, when the signal is selected by the SEL, the synchronization circuit (15, 25, 35, 45) generates a readout control signal based on the video signal supplied from the SEL connected upstream with respect to the own display device, and outputs the readout control signal to the frame memory unit (step S105).

The output unit outputs the video signal to a downstream display device (step S106). In this case, the video signal to be displayed in each display device is the video signal supplied from the MP. Thus, the output unit of the display device that is furthest upstream outputs the video signal played by the MP 10 to a downstream display device, and the display devices further downstream than the second display device select the video signal played by the MP of the display device that is furthest upstream, which has arrived via the video signal lines, and outputs the video signal to downstream display devices via the video signal lines.

Meanwhile, the synchronization circuit generates a readout control signal based on the video signal obtained from the SEL and outputs the readout control signal to the frame memory unit, thereby causing the video signal to be read out from the frame memory unit (step S107). The drive circuit displays the video signal that has been read out on a display device unit (step S108).

According to the embodiment explained above, a readout control signal used in the display device 1 is also commonly used by the display device 2, the display device 3 and the display device 4 other than the display device 1. Thus, even when video media is played by the MPs in each of the display devices, the display of the video signals can be synchronized. Additionally, when synchronizing the display of the video signals, the daisy chained signal lines (video signal lines) are used, so there is no need to provide special lines for synchronization in addition to the daisy chained signal lines. Additionally, while the video media is being played by the MP, there is no need for the video signal lines to transmit the video signal from the signal source 5, so they can be used for transmitting the readout control signals.

Additionally, in the display devices further downstream than the second display device, when a synchronization signal from the video signal of the display device that is furthest upstream in the daisy chain is obtained, it is preferably within the range of the deviation in the playback timing within a single frame in the video signal of the video media being played in each display device.

Figure 6:
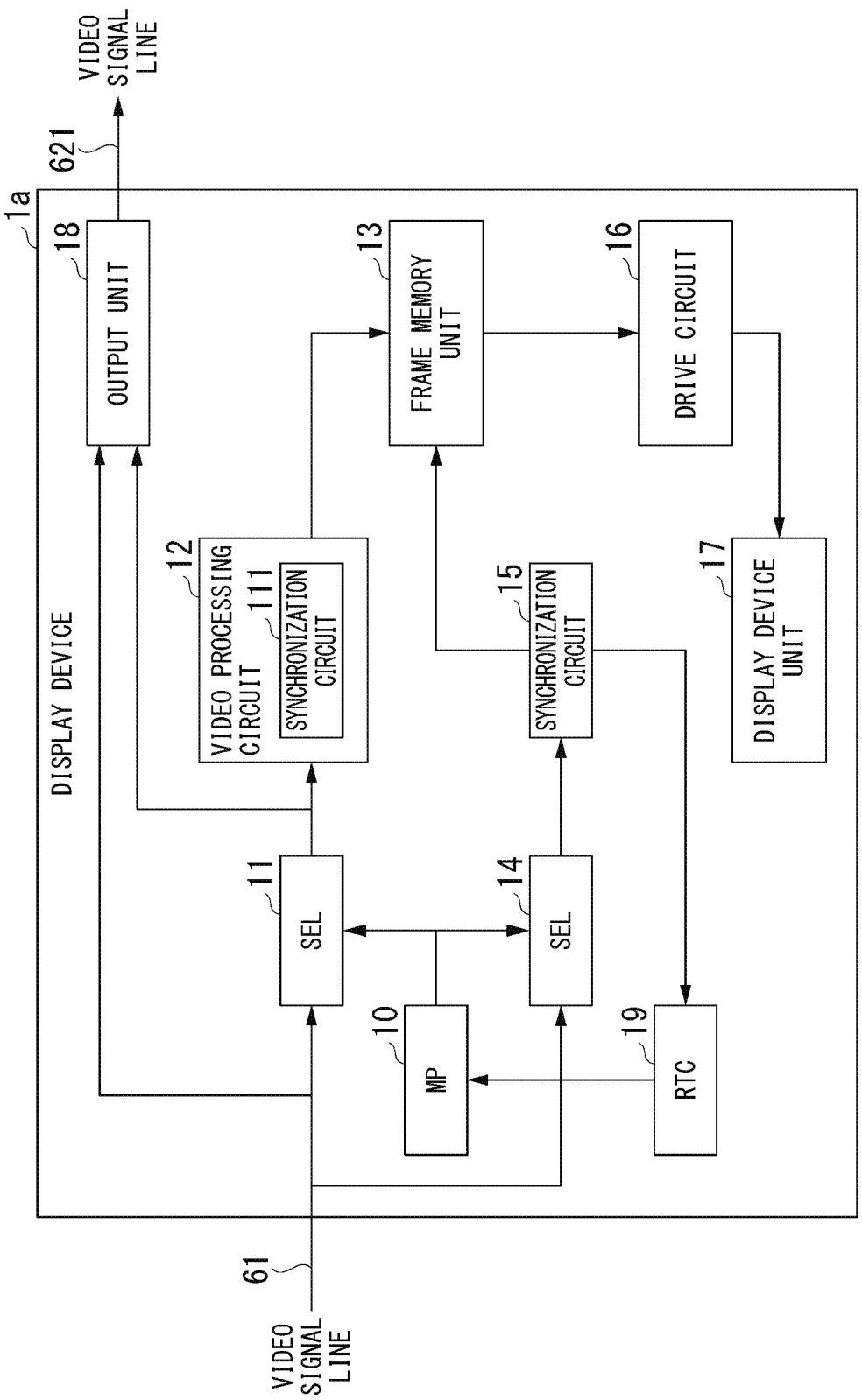
FIG. 6 is a schematic block diagram representing the structure of a display device 1a according to a second embodiment.

FIG. 6 is a schematic block diagram representing the structure of the display device 1*a* according to a second embodiment. The display device 1*a* differs from the display device 1 in the first embodiment in that it further has a real-time clock (hereinafter referred to as an RTC) 19. The RTC 19 has the function of generating time information. Additionally, the RTC 19 instructs the MP 10 regarding the timing for outputting the video signal based on a readout control signal obtained from the synchronization circuit 15 and the generated time information. On the basis thereof, the MP 10 outputs a video signal in accordance with the timing obtained from the RTC 19. In this case, each of the display devices connected further downstream than the second display device have the same function as the RTC 19. Thus, by synchronizing the times in the multiple display devices, it is possible to synchronize or to bring, closer together, the timings by which the video signals are output by the MPs provided in the own display devices. As a result thereof, large deviations in the timings for playing video signals can be reduced in the respective display devices, thereby allowing the amounts of video signals collected in the frame memory units to be reduced. As a result thereof, it is possible to reduce the required capacity of the frame memory units.

As the readout control signal, it is possible to use not only the readout control signal of the display device that is furthest upstream, but also a readout control signal of an external signal source 5. For example, as the readout control signal obtained from the external source, it is possible to use time information obtained by NTP (network time protocol). By sharing such time information between the display devices, the timing by which video media is played by the MP in each display device can be synchronized. As a result thereof, it is possible to reduce the capacity of the frame memory unit.

Figure 7:
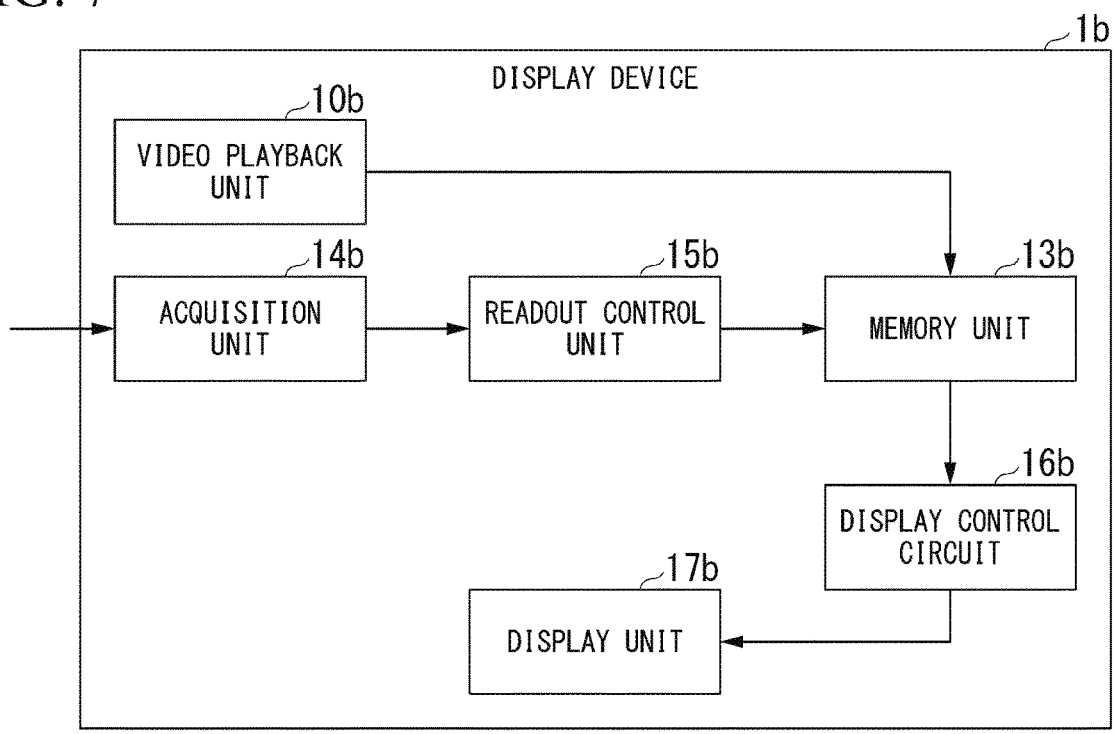
FIG. 7 is a schematic block diagram representing the functions of a display device 1b according to a third embodiment.

FIG. 7 is a schematic block diagram representing the functions of the display device 1*b* in a third embodiment.

A video playback unit 10*b* plays video media. A memory unit 13*b* stores video signals of video media that is to be played. An acquisition unit 14*b* acquires a readout control signal representing the playback timing of the video media in a first display device different from the own display device in a multi-display system formed from multiple display devices. The readout control unit 15*b* causes the video signals from the memory unit 13*b* to be read in accordance with the acquired readout control signal. The display control circuit 16 causes the display unit 17*b* to display the read-out video signals.

Figure 8:
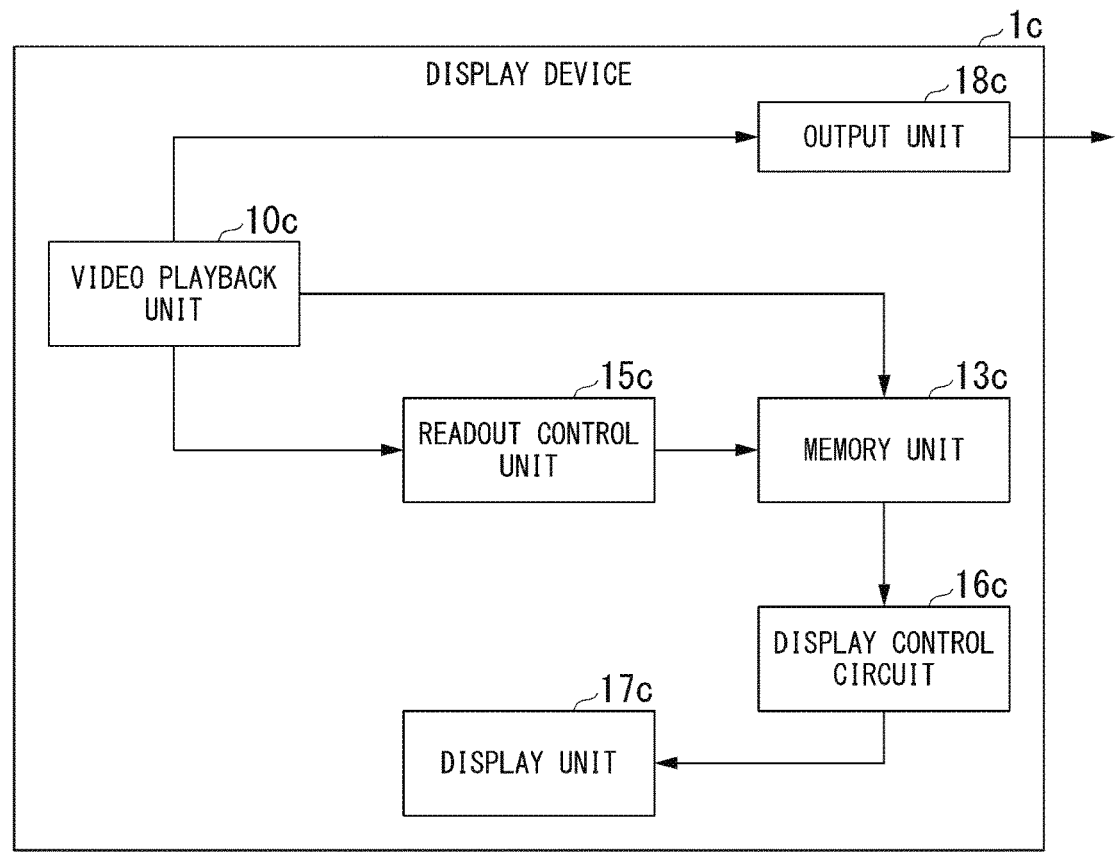
FIG. 8 is a schematic block diagram representing the functions of a display device 1c according to a fourth embodiment.

FIG. 8 is a schematic block diagram representing the functions of the display device 1*c* in a fourth embodiment.

A video playback unit 10*c* plays video media.

A memory unit 13*c* stores video signals of video media that is being played.

An output unit 18*c* outputs, to other display devices, a readout control signal representing the playback timing by which video media is to be played in a own display device in a multi-display system formed from multiple display devices. The readout control unit 15*c* causes video signals to be read out from the memory unit in accordance with the readout control signal. The display control circuit 16*c* causes the display unit 17*c* to display the read-out video signals.

In this case, a multi-display system may be constructed by daisy chaining at least one display device 1*b* according to the third embodiment downstream from a display device 1*c* according the fourth embodiment.

Figure 9:
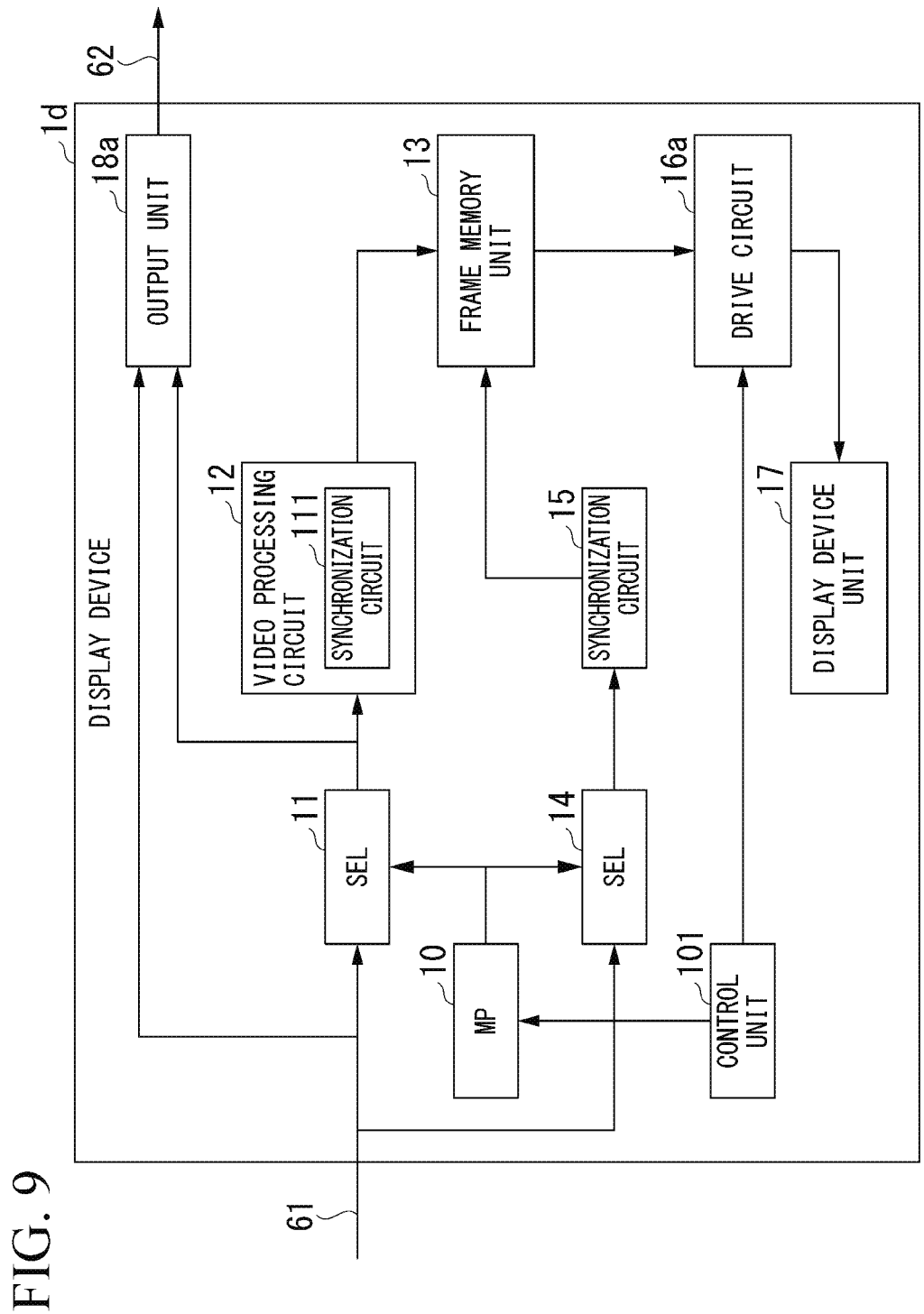
FIG. 9 is a schematic block diagram representing the functions of a display device 1d according to a fifth embodiment.

FIG. 9 is a schematic block diagram representing the functions of the display device 1*d* in a fifth embodiment. Some of the functions of this display device 1*d* are the same as the functions in the display device 1 illustrated in FIG. 3. The parts that are the same will be assigned the same reference numbers as those in FIG. 3, their explanations will be omitted, and the explanation will mainly focus on the differences.

A control unit 101 controls the units in the display device 1*d*. For example, when synchronizing the display timings in the display devices in the multi-display, the control unit 101 plays a test video signal, which is a display-synchronizing video signal, by means of an MP 10. In this embodiment, by playing the test video signal in the display device 1*d*, it is possible to use the test signal in downstream display devices and generate readout control signals by means of a control signal generation unit.

This test video signal may be stored in an internal memory in the MP 10, may be stored in an internal memory in the control unit 101, or may be supplied from a signal source 5 via a video signal line 61. In this embodiment, as one example, the case in which the test video signal is stored in the MP 10 will be explained.

Additionally, the test video signal is a video signal including multiple frames, and the number of frames is within a predetermined number. Additionally, this test video signal is a video signal in which the display content is different in each frame.

Additionally, when the test video signal is played by the MP 10, the control unit 101 outputs, to a drive circuit 16*a*, an instruction that this test video signal should not be displayed.

When an instruction indicating that the test video signal should not be displayed is input from the control unit 101, the drive circuit 16*a* does not display the frames of the test video signal on the display device unit 17. In other words, the drive circuit 16*a* does not display the test video signal even if frame data of the test video signal is output from a frame memory unit 13.

An output unit 18*a* is connected, via a video signal line 62, to a downstream display device (in this case, the display device 2*d*). As this video signal line 62, it is possible to use a communication cable that can transmit at least a video signal and a control signal. The video signal line 62 may, for example, utilize a communication cable compliant with standards such as DisplayPort or HDMI (registered trademark). In this embodiment, the display devices are connected by means of communication cables similar to the video signal line 62.

By using this communication cable, in the multi-display, an upstream-side display device can supply a video signal and a control signal to a display device that is connected downstream.

In this case, when playing the test video signal, the control unit 101 outputs the test video signal from the MP 10 and outputs a control signal indicating that the video signal being played is a test signal. Thus, when the video signal from the MP 10 is selected by the SEL 11, a control signal is supplied to the output unit 18*a* together with the test video signal output from the MP 10, and the output unit 18*a* outputs, to a downstream display device, the test video signal and the control signal indicating that the video signal being played is a test signal.

Additionally, the test video signal may be supplied from the signal source 5.

Figure 10:
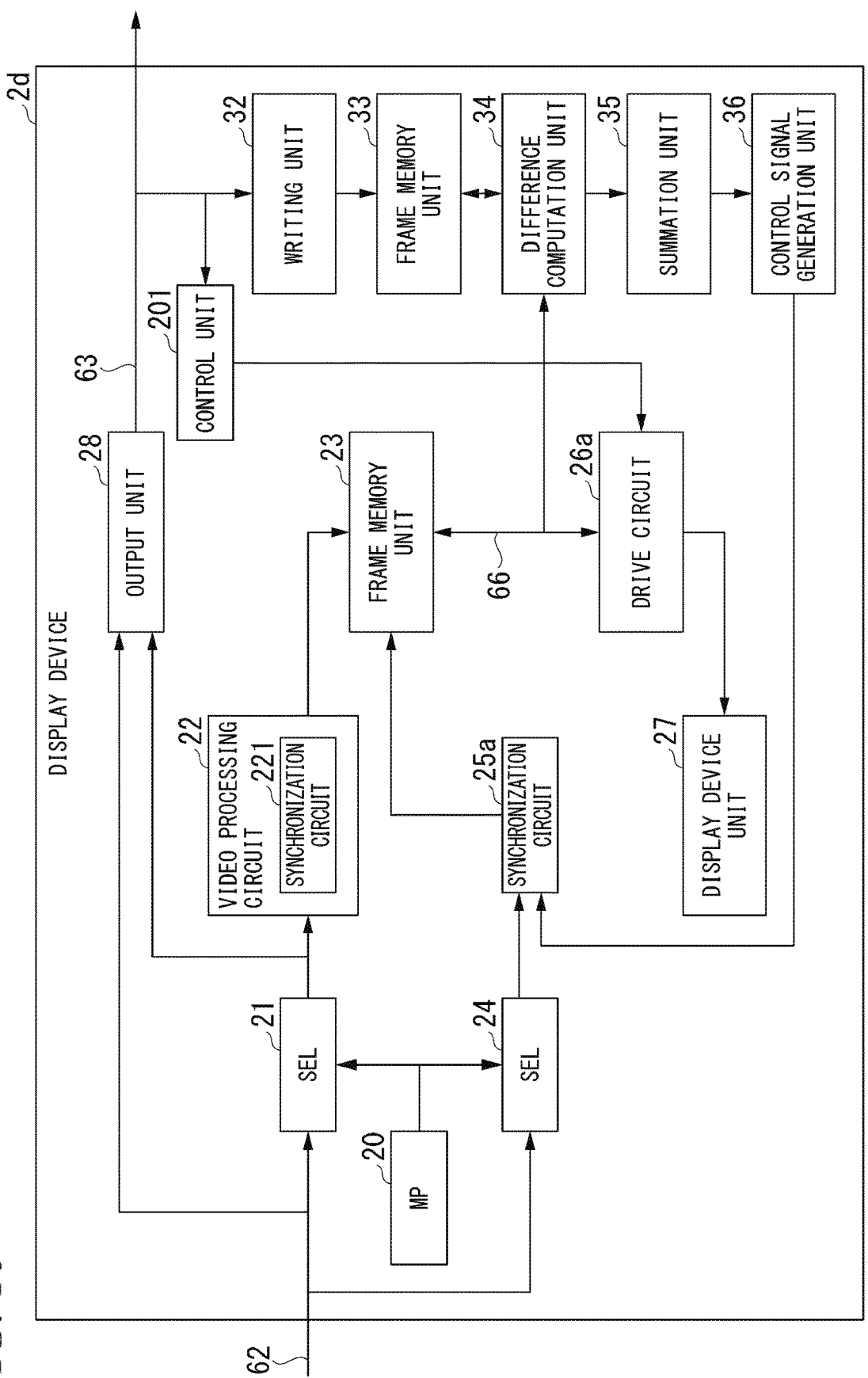
FIG. 10 is a schematic block diagram representing the functions of a display device 2d according to a fifth embodiment.

FIG. 10 is a schematic block diagram representing the functions of the display device 2*d* in the fifth embodiment. Some of the functions of this display device 2*d* are the same as the functions in the display device 2 illustrated in FIG. 4. The parts that are the same will be assigned the same reference numbers as those in FIG. 4, their explanations will be omitted, and the explanation will mainly focus on the differences.

A writing unit 32 is electrically connected to a video signal line 63, receives a video signal output from an output unit 28, and writes this video signal into a frame memory unit 33.

The frame memory unit 33 stores the video signal that is written by the writing unit 32.

A difference computation unit 34 determines the difference between a video signal frame stored in either the frame memory unit 23 or the frame memory unit 33 and a video signal frame stored in the other memory unit for multiple cases while changing the playback timing of the frames in the video signal stored in one of the memory units relative to the playback timing of the frames in the video signal stored in the other memory unit.

When determining the difference, the difference computation unit 34 may determine the difference by a method of determining how much the frame of the video signal stored in the frame memory unit 33 differs from the frame of the video signal stored in the frame memory unit 23, or of determining how much the frame of the video signal stored in the frame memory unit 23 differs from the frame of the video signal stored in the frame memory unit 33.

A summation unit 35 determines the sum of the differences computed by the difference computation unit 34.

A control signal generation unit 36 generates a readout control signal for the video signal stored in the frame memory unit 23 on the basis of the sum computed by the summation unit 35. The control signal generation unit 36 supplies the generated readout control signal to the synchronization circuit 25*a*.

Additionally, the control signal generation unit 36 may, instead of supplying the generated readout control signal to the synchronization circuit 25*a*, supply the readout control signal to another unit.

For example, the control signal generation unit 36 may generate a readout control signal for the video signal stored in the frame memory unit 23 based on the sum computed by the summation unit 35, and may supply the generated readout control signal to the MP 20. In this case, the MP 20 changes (sets) the timing at which the video signal is output, based on the readout control signal supplied from the control signal generation unit 36, so that the difference in the display timing is within a single frame.

Additionally, for example, the control signal generation unit 36 generates a readout control signal for the video signal stored in the frame memory unit 23 based on the sum computed by the summation unit 35, and can supply the generated readout control signal to the video processing circuit 22 or a synchronization circuit 221. In this case, the video processing circuit 22 or the synchronization circuit 221 to which the readout control signal has been supplied changes the timing of writing into the frame memory unit 23 so that the difference in the display timing is within a single frame. In this case, a frame memory unit is provided inside the video processing circuit 22. Then, a video signal obtained from the SEL 21 is temporarily stored in the frame memory unit inside the video processing circuit 22, and in accordance with the timing by which the readout control signal is supplied, the video processing circuit 22 or the synchronization circuit 221 writes the temporarily stored video signal into the frame memory unit 23 at a timing such that the difference in the display timing is within a single frame.

The synchronization circuit 25a has the function of a synchronization circuit 25, and also has the function of supplying, to a frame memory unit 23, a readout control signal generated by the control signal generation unit 36. Thus, the synchronization circuit 25a can cause a frame of the video signal, corresponding to the readout control signal generated by the control signal generation unit 36, to be read.

The control unit 201 controls the units in the display device 2d. For example, the control unit 201 determines whether or not the video signal input from the video signal line 63 is a test video signal. For example, the control unit 201 can determine whether or not the video signal is a test video signal by determining whether or not it contains a control signal indicating that a test video signal is to be played.

If it is determined that the video signal is a test video signal, then the control unit 201 outputs, to the drive circuit 26a, instructions indicating that the video signal should not be displayed. If it is determined that the video signal is not a test video signal, then the control unit 201 does not output instructions indicating that the video signal should not be displayed.

The drive circuit 26a does not display the frames of a test video signal on the display device unit 27. In other words, the drive circuit 26a becomes non-displaying for the test video signal when an instruction indicating that a video signal should not be displayed is input from the control unit 201. For example, if an instruction indicating that the video signal from the control unit 201 should not be displayed is input, then the drive circuit 26a may become non-displaying by suspending the output of the drive signal to the display device unit 17.

Additionally, when an instruction that the video signal should be not displayed is not input from the control unit 201, the drive circuit 26a displays the video signal on the display device unit 27. Thus, the drive circuit 26a does not display, on the display device unit 27, frames that are used by the control signal generation unit 36 to generate the readout control signal.

Additionally, the drive circuit 26a may display a fixed video signal on the display device unit 27 when an instruction indicating that a video signal should not be displayed is input from the control unit 201. The fixed video signal may, for example, be a video signal for displaying the entire screen in a specific color. The specific color may be black or white. When displaying the fixed video signal, the drive circuit 26a displays the fixed signal regardless of the video signal being read out from the frame memory unit.

Additionally, the drive circuit 26a may mute the display of the video signal when an instruction indicating that the video signal should not be displayed is input from the control unit 201.

Figure 11:
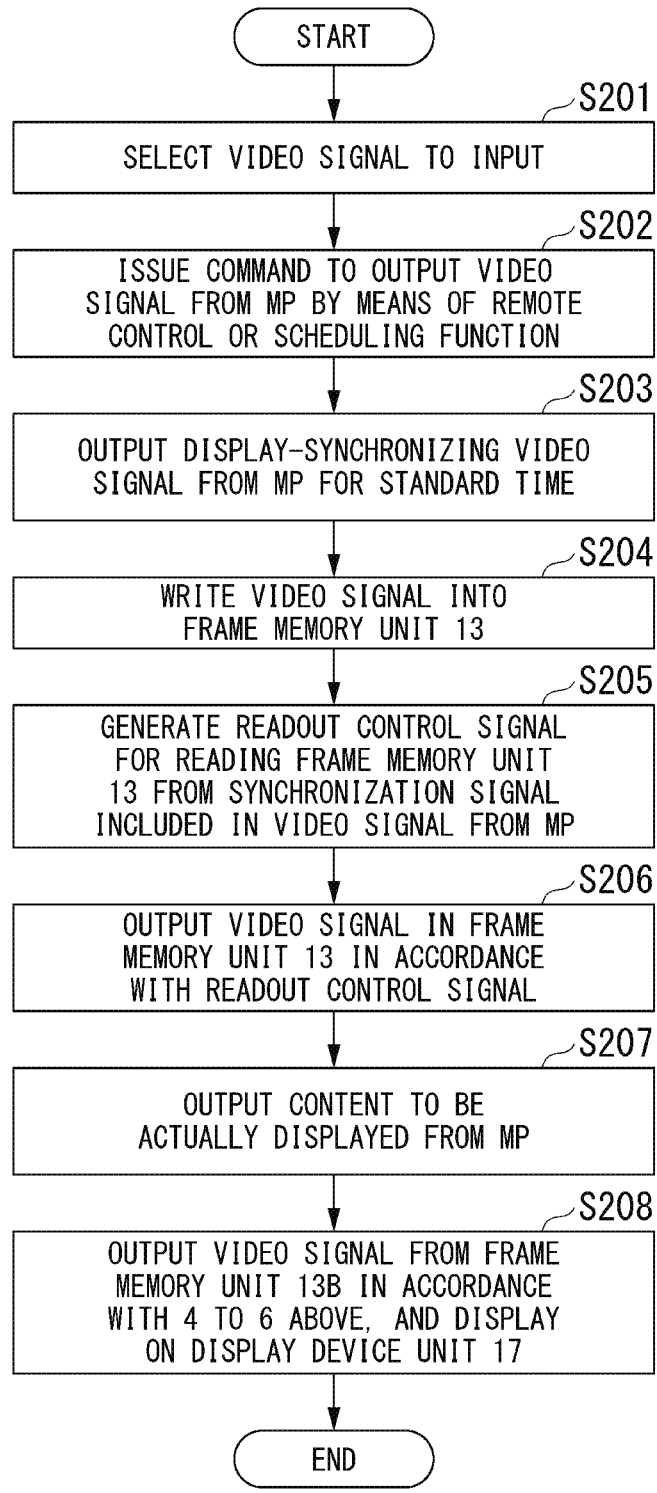
FIG. 11 is a flow chart for explaining the operations in the display device 1d.

FIG. 11 is a flow chart for explaining the operations in the display device 1 in FIG. 9.

The SEL 11 selects a video signal to input (step S201). In this case, the SEL 11 selects the video signal supplied from the MP 10.

Next, when a command to output a video signal from the MP 10 is issued by a remote control device of the display device 1d or a scheduling function provided in the display device 1d (step S202), the control unit 101 acquires said command. Upon acquiring this command, the control unit 101 outputs, to the MP 10, instructions to play the test video signal, and outputs, to the drive circuit 16a, instructions indicating that the drive circuit 16a should not display the video signal.

Upon acquiring the test video signal playback instruction from the control unit 101, the MP 10 outputs the test video signal, as a display-synchronizing video signal, for a standard time (step S203). The SEL 11 selects the test video signal supplied from the MP 10. In this case, the number of frames included in the test video signal is predetermined. Thus, by playing the test video signal that is to be played, the test video signal can be output, via the SEL 11, to the video processing circuit 12 and the output unit 18a for a standard time.

The output unit 18a outputs the test video signal obtained from the SEL 11 to a downstream display device (in this case, the display device 2d) via the video signal line 62. Due to the test video signal being output from the output unit 18a, the display device 2d can determine the timing by which the frames of video signals are to be displayed by using the synchronization signal in this test video signal.

When the test video signal is input from the SEL 11, the video processing circuit 12 uses the synchronization signal contained in the test video signal to generate a video signal for each frame in accordance with a timing corresponding to this synchronization signal, and writes the video signal into the frame memory unit 13 (step S204). This synchronization signal is a signal representing the timing by which it is possible to generate a first frame image based, for example, on a horizontal synchronization signal or a vertical synchronization signal. For example, the synchronization signal is a signal representing the timing by which each frame of video media is to be read out. Additionally, the synchronization signal represents the timing by which each frame of the video media is sequentially read out at fixed intervals.

On the other hand, the SEL 14 selects the test video signal output from the MP 10 and outputs the test video signal to the synchronization circuit 15.

When the test video signal is input from the SEL 14, the synchronization circuit 15 generates a readout control signal representing the timing by which the video signal is to be read out from the frame memory unit 13 based on a timing in accordance with a horizontal synchronization signal or a vertical synchronization signal in this test video signal (step S205).

The frame memory unit 13 outputs, frame by frame, a video signal stored in that frame memory unit 13 in accordance with the readout control signal output from the synchronization circuit 15 (step S206).

The drive circuit 16a has received, as an input, an instruction indicating that the video signal from the control unit 101 should not be displayed, and thus does not cause to be displayed, on the display device unit 17, frames that are output from the frame memory unit 13 while this instruction is being input.

On the other hand, when the output of the test video signal ends, the MP 10 outputs a video signal that is to be actually displayed on the display device unit 17 (step S207). By a timing at which the video signal being played by the MP 10 switches from the test video signal to the video signal that is to be actually displayed on the display device unit 17, the control unit 101 suspends the outputting, to the drive circuit 16a, of instructions indicating that the video signal should not be displayed. Thus, the video signal is written into the frame memory unit 13 by the video processing circuit 12. Additionally, when the video signal that is to be actually displayed on the display device unit 17 is supplied from the SEL 14, the synchronization circuit 15 generates a readout control signal indicating the timing for reading out the video signal from the frame memory unit 13 based on a timing in accordance with a horizontal synchronization signal or a vertical synchronization signal in this video signal.

The frame memory unit 13 outputs, frame by frame, a video signal stored in that frame memory unit 13 based on the readout control signal output from the synchronization circuit 15. The drive circuit 16a displays, on the display device unit 17, the video signal of each frame output from the frame memory unit 13 (step S208).

Thereafter, the procedure from step S204 to step S208 is repeated, thereby the video signal is displayed on the display device unit 17.

Thus, while the test video signal is being played, the test video signal is not displayed on the display device unit 17, and when the video signal switches from the test video signal to the video signal that is to be actually displayed, the video signal is displayed on the display device unit 17.

Next, the operations in the display device 2d will be explained by using the flow chart in FIG. 12.

The SEL 21 selects a video signal to input (step S301). In this case, the SEL 21 selects the video signal supplied from the MP 20.

Next, when a command to output a video signal from the MP 20 is issued by a remote control device of the display device 2d or a scheduling function provided in the display device 2d (step S302), the MP 20 acquires said command and outputs the test video signal for a standard time in accordance with this command (step S303). Additionally, the summation unit 35 resets the summation result. This reset may be performed at the timing of step S303, or at the timing the command to output the video signal is issued in step S302.

Additionally, in this case, the number of frames included in the test video signal is predetermined. Thus, by playing the test video signal that is to be played, the test video signal can be output, via the SEL 21, to the video processing circuit 22 and the output unit 28 for a standard time.

The output unit 28 outputs the test video signal via the video signal line 63. The test video signal output from the output unit 28 is supplied to the frame memory unit 33, the control unit 201, and a downstream display device. The frame memory unit 33 stores a test video signal output from the output unit 28. In this case, the storage capacity of the frame memory unit 33 is a capacity allowing the respective frames of the test video signal to be stored. For example, if the test video signal is a video signal that is five frames long, then the frame memory unit 33 has enough storage area to store five frames of a video signal. The number of frames of a video signal contained in the test video signal may be set in accordance with the number of frames that can be stored in the frame memory unit 33.

The control unit 201 determines whether or not the video signal output from the output unit 28 is a test video signal. In this case, the control unit 201 determines that the video signal output from the output unit 28 is a test video signal, and outputs, to the drive circuit 26a, instructions indicating that a video signal should not be displayed. As a result thereof, after the test video signal is output from the output unit 28, the drive circuit 26a does not display the video signal on the display device unit 17 until a video signal that is not a test video signal (a video signal that is to be actually displayed) is output from the output unit 28. Thus, the test video signal can be kept from being displayed on the display device unit 17 while the test video signal is used to generate a synchronization signal.

When the test video signal is input from the SEL 21, the video processing circuit 22 uses the synchronization signal contained in the test video signal to generate a video signal for each frame in accordance with a timing corresponding to this synchronization signal, and writes the video signal into the frame memory unit 23 (step S304). This synchronization signal is, for example, a signal representing the timing by which it is possible to generate a single frame image, based on a horizontal synchronization signal or a vertical synchronization signal. In this case, the storage capacity of the frame memory unit 23 is a capacity allowing the respective frames of the test video signal to be stored. For example, if the test video signal is a video signal that is five frames long, then the frame memory unit 23 has a storage area capable of storing five frames of a video signal. The number of frames of a video signal included in the test video signal may be set in accordance with the number of frames that can be stored in the frame memory unit 23.

The SEL 24 selects the video signal supplied from the video signal line 62 and supplies the video signal to the synchronization circuit 25a. In this case, the test video signal is supplied from the SEL 24 to the synchronization circuit 25a. The synchronization circuit 25a generates a readout control signal representing the timing by which the video signal is to be read out from the frame memory unit 23 based on the timing of a horizontal synchronization signal or a vertical synchronization signal in the video signal obtained from the SEL 24 (step S305).

The frame memory unit 23 outputs, frame by frame, a video signal stored in that frame memory unit 23 in accordance with the readout control signal output from the synchronization circuit 25a (step S306). The video signal of each frame is supplied to the drive circuit 26a and the difference computation unit 34.

Meanwhile, when the video signal of each frame is supplied form the frame memory unit 23, the difference computation unit 34 computes the difference between the video signal of each frame stored in the frame memory unit 33 and the video signal of each frame supplied from the frame memory unit 23. The summation unit 35 sums the obtained differences and stores the summation results (step S307).

Furthermore, the difference computation unit 34 repeatedly performs the procedure from step S303 to step S307. In this case, each time the difference computation unit 34 repeats the procedure from step S303 to step S307, it generates a readout control signal in which the readout from the frame memory unit 23 in step S305 is delayed by one frame relative to the previous time (step S308). The summation unit 35 computes the sum value each time the procedure from step S303 to step S307 is performed, and stores each computed sum value.

The difference computation unit 34 determines the number of times that the procedure from step S303 to step S307 is to be repeatedly performed in accordance with the number of frames in the test video signal stored in the frame memory unit 23, and repeatedly performs the procedure in accordance with the determined number of times (step S309). In this case, there are five frames in the test video signal, and the frame memory unit 23 stores a video signal that is five frames long. Thus, the procedure is repeated five times. As a result thereof, for example, when step S308 is performed five times, the sum of the differences is determined after generating a readout control signal at a timing delayed by five frames.

Figure 13A:
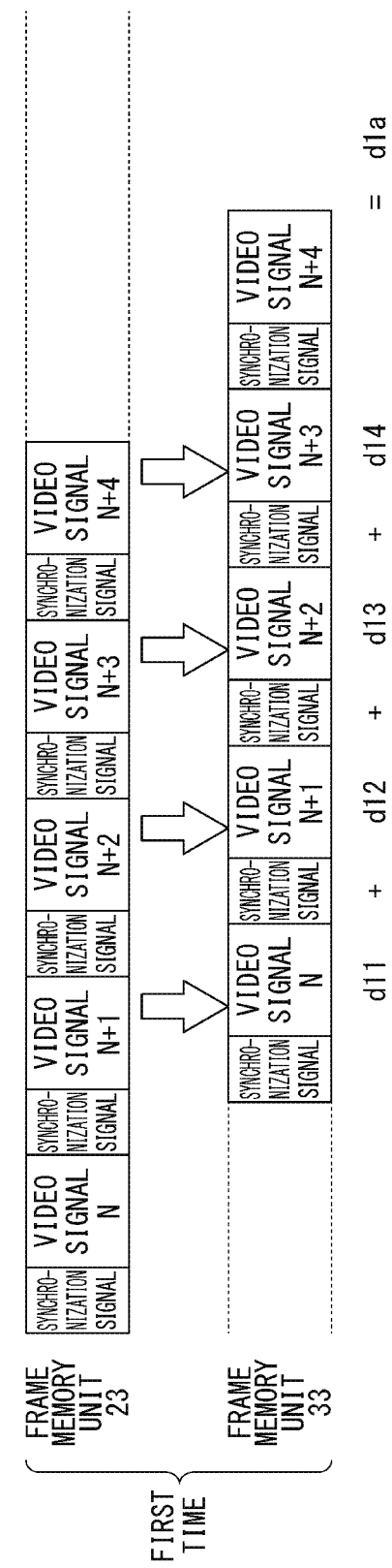
FIG. 13A is a diagram illustrating the relationship between the frames, respectively, in a frame memory unit 23 and a frame memory unit 33.
Figure 13B:
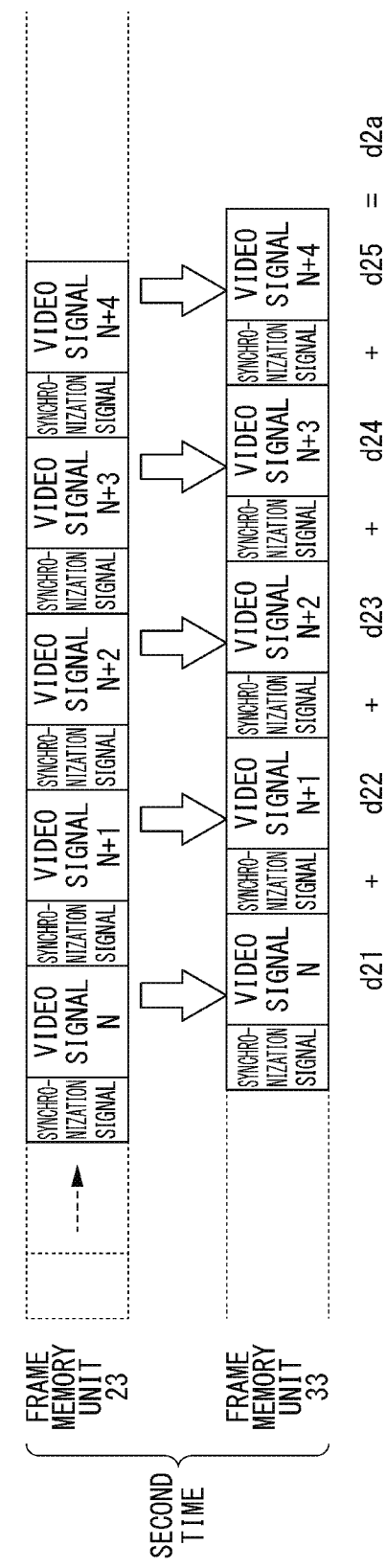
FIG. 13B is a diagram illustrating the relationship between the frames, respectively, in the frame memory unit 23 and the frame memory unit 33.

For example, the relationship between the frame memory unit 23 and the frame memory unit 33 when executing step S307 for the first time is shown in FIG. 13A. When executing step S307 for the second time, as illustrated in FIG. 13B, the differences between the frames in the frame memory unit 23 and the frame memory unit 33 are determined for the case in which the frames in the frame memory unit 23 are played at a timing that is delayed, relative to the frames in the frame memory unit 33, by the time of one frame with respect to the playback timing of the frames in the frame memory unit 23 during the previous time (first time).

Similarly, the third and fourth times that the procedure is performed, the differences between the frames in the frame memory unit 23 and the frame memory unit 33 are determined for the cases in which the frames are played at a timing that is further delayed, respectively, by a time equivalent to one frame in the video signal in the frame memory unit 23.

Figure 13C:
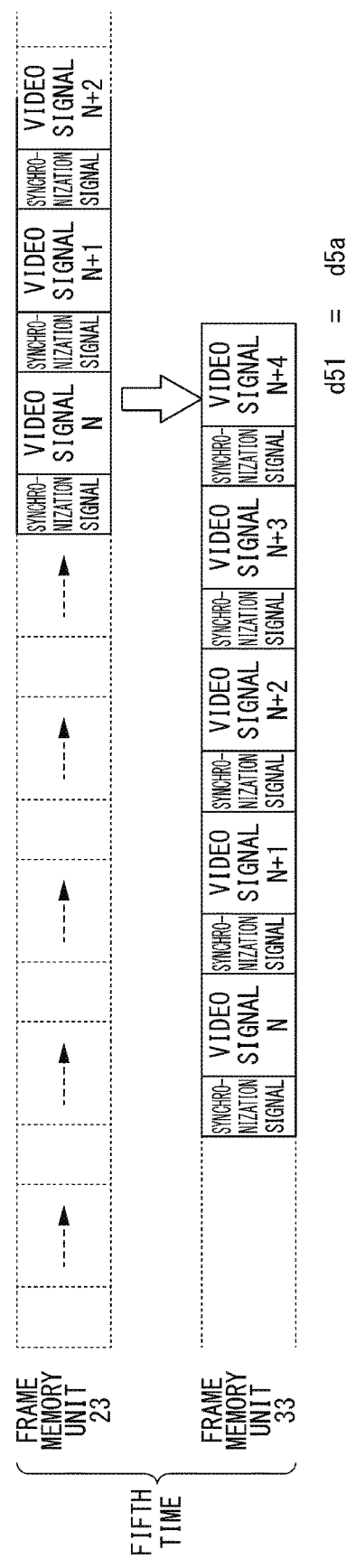
FIG. 13C is a diagram illustrating the relationship between the frames, respectively, in the frame memory unit 23 and the frame memory unit 33.

Furthermore, the relationship between the frame memory unit 23 and the frame memory unit 33 when step S307 is performed for the fifth time is illustrated in FIG. 13C.

Thus, the summation unit 35 determines the difference sum values (d1a, d2a, d3a, d4a and d5a) for the cases in which step S307 is performed for the first to the fifth times.

When there is a frame in the frame memory unit 33 corresponding to the playback time of a frame in the frame memory unit 23, the differences may be determined between the corresponding frames. If there is no frame in the frame memory unit 33 corresponding to the playback time of a frame in the frame memory unit 23, then it can be determined that there is a time difference of at least six frames, and it is possible to not use this playback timing to generate a readout control signal.

Next, the difference computation unit 34 returns the readout control signal for reading the frame memory unit 23 to the first timing, and after doing so, delays the readout from the frame memory unit 33 by one frame, computes the difference between the video signal of each frame stored in the frame memory unit 33 and the video signal of each frame supplied from the frame memory unit 23, and determines the difference obtained each time there is a difference. The summation unit 35 determines the difference sum values and stores the summation results (step S310).

Furthermore, the difference computation unit 34 repeatedly performs the difference sum value computation process. This difference sum value computation process is similar to the process from step S303 to step S307 above. In this case, the difference computation unit 34 does not change the readout control signal in step S305 and performs the difference sum value computation process by delaying the readout control signal for the frame memory unit 33 by one frame relative to the previous time (step S311).

The difference computation unit 34 repeatedly performs the difference sum value computation process in accordance with the number of frames of the test video signal stored in the frame memory unit 33 (step S312). In this case, the process is repeated one less time than the number of frames stored in the frame memory unit 33. More specifically, if there are five test video signal frames stored in the frame memory unit 33, then the process is repeated four times. As a result thereof, for example, when step S308 is performed four times, the difference summation is computed after generating a readout control signal at a timing delayed by four frames.

Figure 14A:
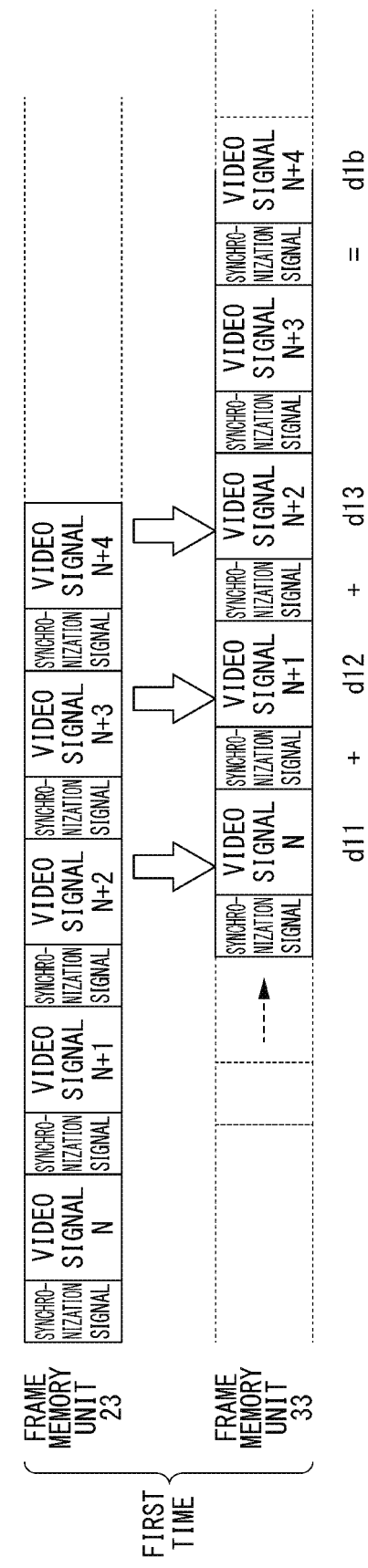
FIG. 14A is a diagram illustrating the relationship between the frames, respectively, in the frame memory unit 23 and the frame memory unit 33.
Figure 14B:
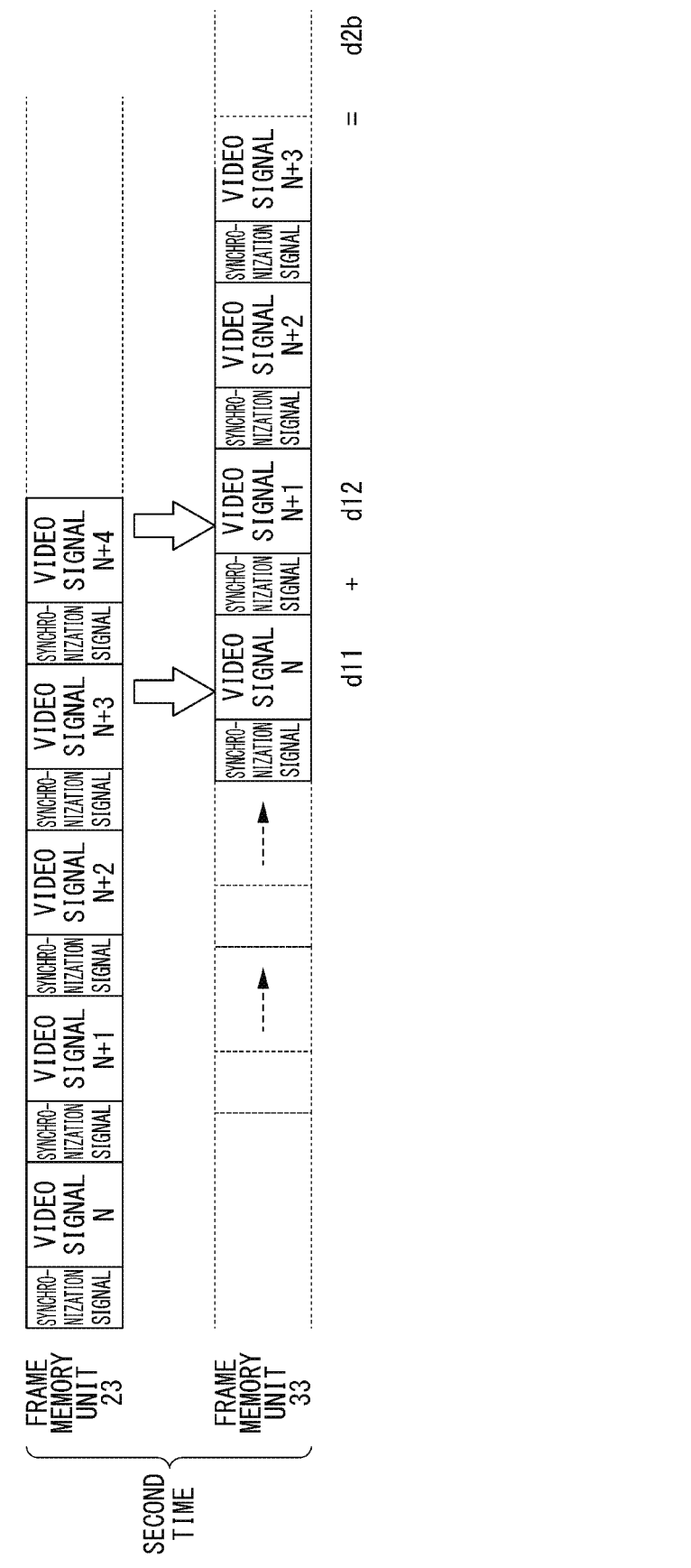
FIG. 14B is a diagram illustrating the relationship between the frames, respectively, in the frame memory unit 23 and the frame memory unit 33.

For example, the relationship between the frame memory unit 23 and the frame memory unit 33 when executing step S310 for the first time is shown in FIG. 14A. When executing step S310 for the second time, as illustrated in FIG. 14B, the differences between the frames in the frame memory unit 23 and the frame memory unit 33 are determined for the case in which the frames in the frame memory unit 33 are played at a timing that is delayed, with reference to the frames in the frame memory unit 23, by the time of one frame with respect to the playback timing of the frames in the frame memory unit 23 during the previous time (first time).

Similarly, the third time the procedure is performed, the differences between the frames in the frame memory unit 23 and the frame memory unit 33 are determined for the case in which the frames are played at a timing that is delayed by a time equivalent to a frame in the video signal in the frame memory unit 23.

Furthermore, the relationship between the frame memory unit 23 and the frame memory unit 33 when step S310 is performed for the fourth time is illustrated in FIG. 14C.

Thus, the summation unit 35 determines the difference sum values (d2b, d2b, d3b and d4b (no corresponding frame)) for the cases in which step S307 is performed for the first to the fifth times.

Additionally, the difference determined in step S310 may be determined, in the case in which there is a frame in the frame memory unit 33 corresponding to the playback time of a frame in the frame memory unit 23, as the difference between the corresponding frames. If there is no frame in the frame memory unit 33 corresponding to the playback time of a frame in the frame memory unit 23, then it can be determined that there is a time difference of six frames or more, and it is possible to not use this playback timing to generate a readout control signal.

Additionally, if there is no frame in the frame memory unit 33 corresponding to the playback time of a frame in the frame memory unit 23, then the difference computation unit 34 may determine the difference by using, as the frame in the frame memory unit 33, a prescribed frame such that the difference becomes greater than the difference between frames when there is a frame in the frame memory unit 33 corresponding to the playback time of a frame in the frame memory unit 23. As the prescribed frame, for example, it is possible to use a frame in which black is displayed in the entire area (an all-black frame).

Additionally, if there is no frame in the frame memory unit 33 corresponding to the playback time of a frame in the frame memory unit 23, then the difference computation unit 34 may detect that there is no corresponding frame, and may output information indicating a difference greater than the difference between frames when there is a frame in the frame memory unit 33 corresponding to the playback time of a frame in the frame memory unit 23.

Next, the frame memory unit 33 returns the readout control signal for reading out video signals recorded in that frame memory unit 33 to the timing for the first time (step S313). The timing for the first time refers to the timing of the readout control signal when step S310 is first executed.

The summation unit 35 outputs the stored sum values to the control signal generation unit 36.

The control signal generation unit 36 determines whether or not, among the sum values (a total of nine in the above-described example), there is a value corresponding to the case in which the timing of a video signal obtained from the video signal line 63 connected to the output unit 28 is the same as that of a video signal 66 output from the frame memory unit 23, and if there is a value corresponding to the case in which the timing is the same, then the readout control signal at that time is generated as the readout control signal for the frame memory unit 23 (step S314).

In this case, the number of frames contained in the test video signal and the content of the video in each frame is known. For this reason, when computing the differences between the respective frames in the frame memory unit 23 and the frame memory unit 33, cumulative values of the differences of the frames in the frame memory unit 23 with respect to the frames in the frame memory unit 33 are calculated beforehand as cumulative values for the respective cases in which the frames in the frame memory unit 33 are delayed by one to five frames with respect to the frames in the frame memory unit 33, and the respective cumulative values are pre-stored in a memory unit inside the control signal generation unit 36. Furthermore, the cumulative values of the differences of the frames in the frame memory unit 33 with respect to the frames in the frame memory unit 23 are pre-calculated for the respective cases in which the frames in the frame memory unit 23 are delayed with respect to the frames in the frame memory unit 33 by one to four frames, and the respective cumulative values are pre-stored in the memory unit inside the control signal generation unit 36. After doing so, the control signal generation unit 36 pre-stores the cumulative value, among the respective cumulative values, at which the cumulative value is that for the case in which a frame in the frame memory unit 23 is the same as a frame in the frame memory unit 33.

Then, if there is a cumulative value, among the cumulative values determined in step S314, that is the same as the cumulative value for the case in which a frame in the frame memory unit 23 is the same as a frame in the frame memory unit 33, the control signal generation unit 36 can generate a readout control signal based on the playback timing of the frame memory unit 33 and the frame memory unit 23 when that cumulative value was determined. As a result thereof, the playback timing of the own display device can be synchronized with that of the display device that is furthest upstream.

Additionally, there may be cases in which a cumulative value that is the same as the cumulative value when a frame in the frame memory unit 23 is the same as a frame in the frame memory unit 33 is not obtained in step S314. In such a case, among the multiple pre-stored cumulative values, a cumulative value that is the same as a cumulative value for a combination of frames at which the playback timing is as close as possible to the playback timing when a frame in the frame memory unit 23 is the same as a frame in the frame memory unit 33 is selected. Furthermore, a readout control signal is generated on the basis of the combination of frames in the frame memory unit 23 and the frame memory unit 23 at which the selected cumulative value was computed. As a result thereof, the deviation in the playback timing of the own display device relative to the display device that is furthest upstream can be held to approximately a few frames.

When the readout control signal is generated, the MP 20 outputs a video signal that is to form the content to be actually displayed (step S315). In this case, the control signal generation unit 36 can generate a readout control signal in accordance with the sum values determined by the summation unit 35 while the test video signal is being played. Thus, in the display device 1*d* and the display device 2*d*, the playback timing of the video signal that is to be actually displayed is preferably of a level that there is not too much deviation between the MP 10 and the MP 20. The SEL 21 supplies the video signal played by the MP 20 to the video processing circuit 22 and the output unit 28. The output unit 28 is supplied the video signal from the SEL 21. However, the video signal is played by the MP 20, so the video signal supplied from the video signal line 62 is selected, and the video signal is output to a downstream display device. As a result thereof, in the downstream display device, it is possible to read, from the frame memory unit, the video played by the MP using the synchronization signal in the video signal supplied from the first display device.

Additionally, after the readout control signal has been generated, the display device 2*d* may continuously perform processes for outputting a video signal that is to form the content to be actually displayed. Additionally, after performing the synchronization process for synchronizing the display timing of video signals based on FIG. 12 and generating a readout control signal, the display device 2*d* may perform a process for outputting the video signal that is to form the content to be actually displayed in accordance with a timing at which a playback instruction is input from an external source.

Figure 12:
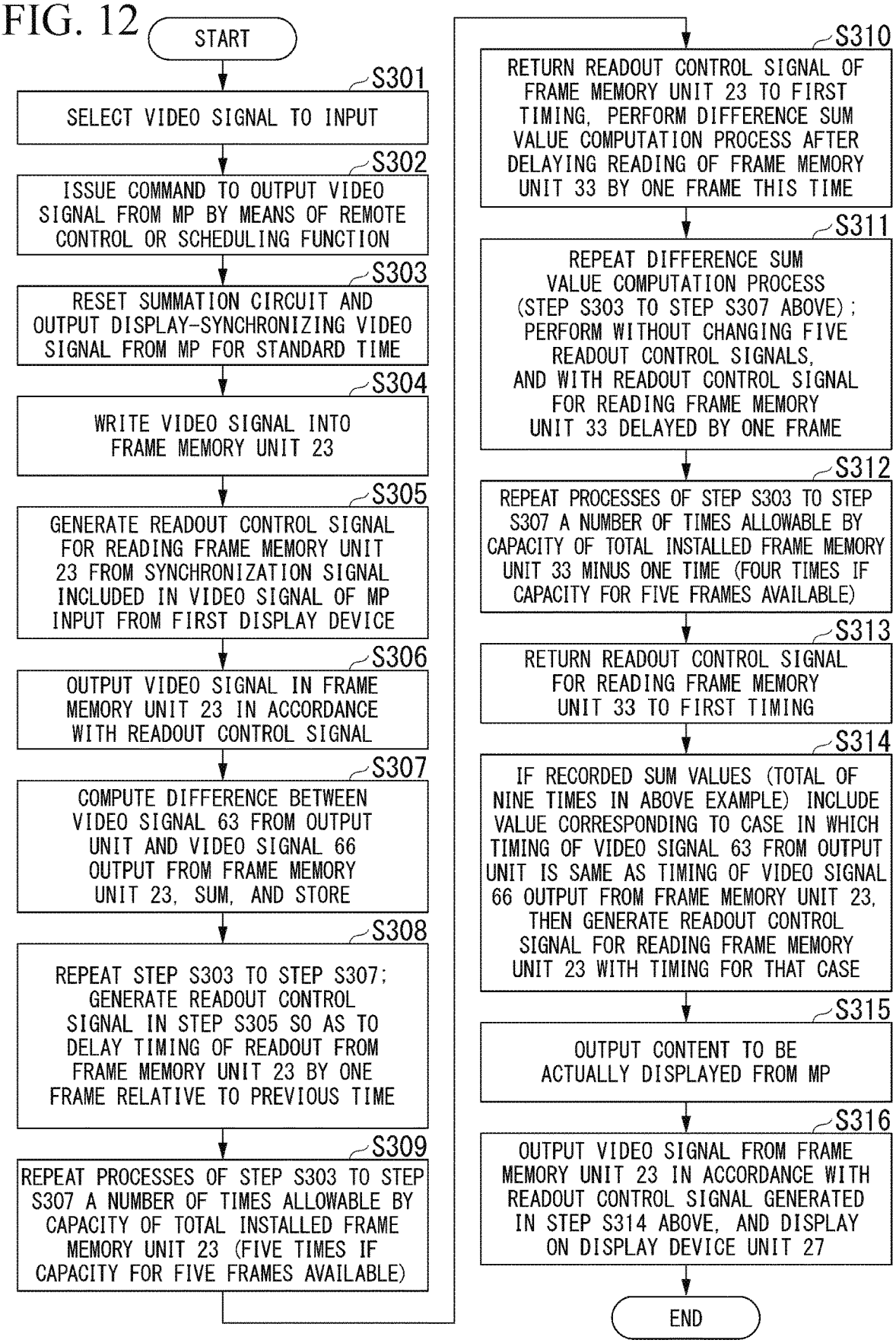
FIG. 12 is a flow chart for explaining the operations in the display device 2d.

After the downstream display devices in the multi-display system, such as the display device 2*d*, have performed synchronization processes for synchronizing the display timing of the video signal based on FIG. 12, the display devices in the entire multi-display system enter a synchronized state. For this reason, when displaying the video signal that is to form the content to be actually displayed, it can be displayed by synchronizing (matching the display timing) of the entire multi-display system.

Additionally, the display devices in the multi-display system can execute the synchronization process explained in FIG. 5 after the synchronization process explained in FIG. 12 has been performed. As a result thereof, by performing the synchronization process in FIG. 12, the deviation in the display timing can be held to within one frame, and after doing so, by performing the synchronization process explained in FIG. 5, the deviation in the display timing can be made even smaller.

The video processing circuit 22 generates frames in a video signal being played by the MP 20 in accordance with a synchronization signal contained in this video signal, and stores each frame separately in the frame memory unit 23.

The synchronization circuit 25*a* causes the video signal to be read from the frame memory unit 23, frame by frame, in accordance with the readout control signal generated by the control signal generation unit 36. As a result thereof, the frames of the video signal are supplied sequentially from the frame memory unit 23 to the drive circuit 26*a* in accordance with a readout control signal generated by the control signal generation unit 36. The drive circuit 26*a* displays by the display device unit 27, frame by frame, the video signal supplied from the frame memory unit 23 (step S316).

By summing the differences between multiple frames of a video signal stored in the frame memory unit 23 and the frame memory unit 33 in this way, it is possible to determine whether the display timing is synchronized within the range of those multiple frames. As a result thereof, even if there is a difference of a few frames in the display timing, the display timing can be synchronized.

Figure 15:
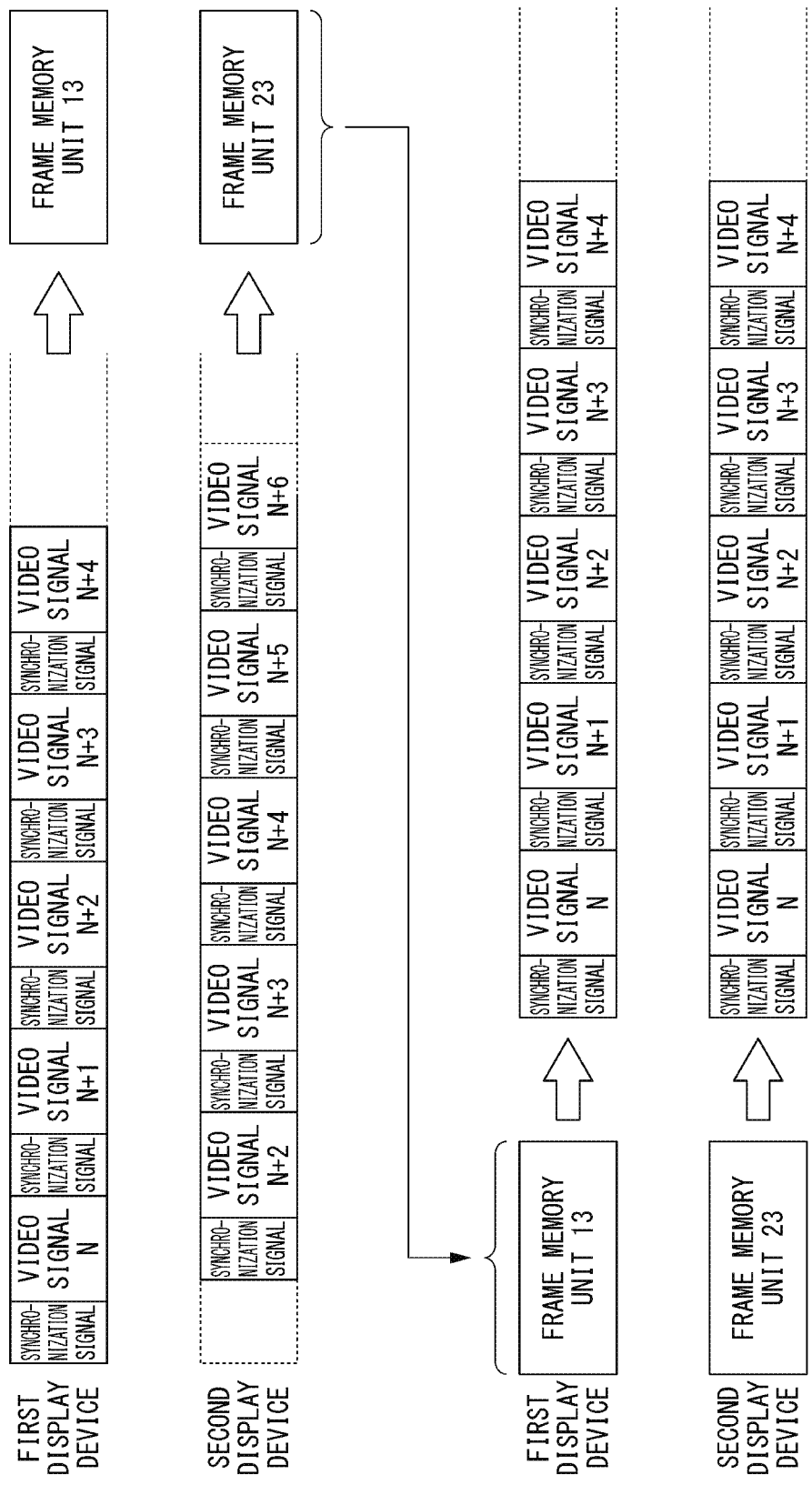
FIG. 15 is a diagram for explaining the display timing of frames in a display device 1d (frame memory unit 13) and a display device 2d (frame memory unit 23).

Additionally, the range over which the display timing can be synchronized is not limited to being a difference within one frame. For example, as illustrated in FIG. 15, even if there is a difference in the frame display timing of two or more frames between the display device 1d (frame memory unit 13) and the frame device 2d (frame memory unit 23), the display timing can be synchronized as long as it is within a range of a few frames.

Additionally, even if there is not a timing that is the same within the range of these multiple frames, the degree of deviation in the display timing can be held to within one frame or to within a few frames.

Figure 16:
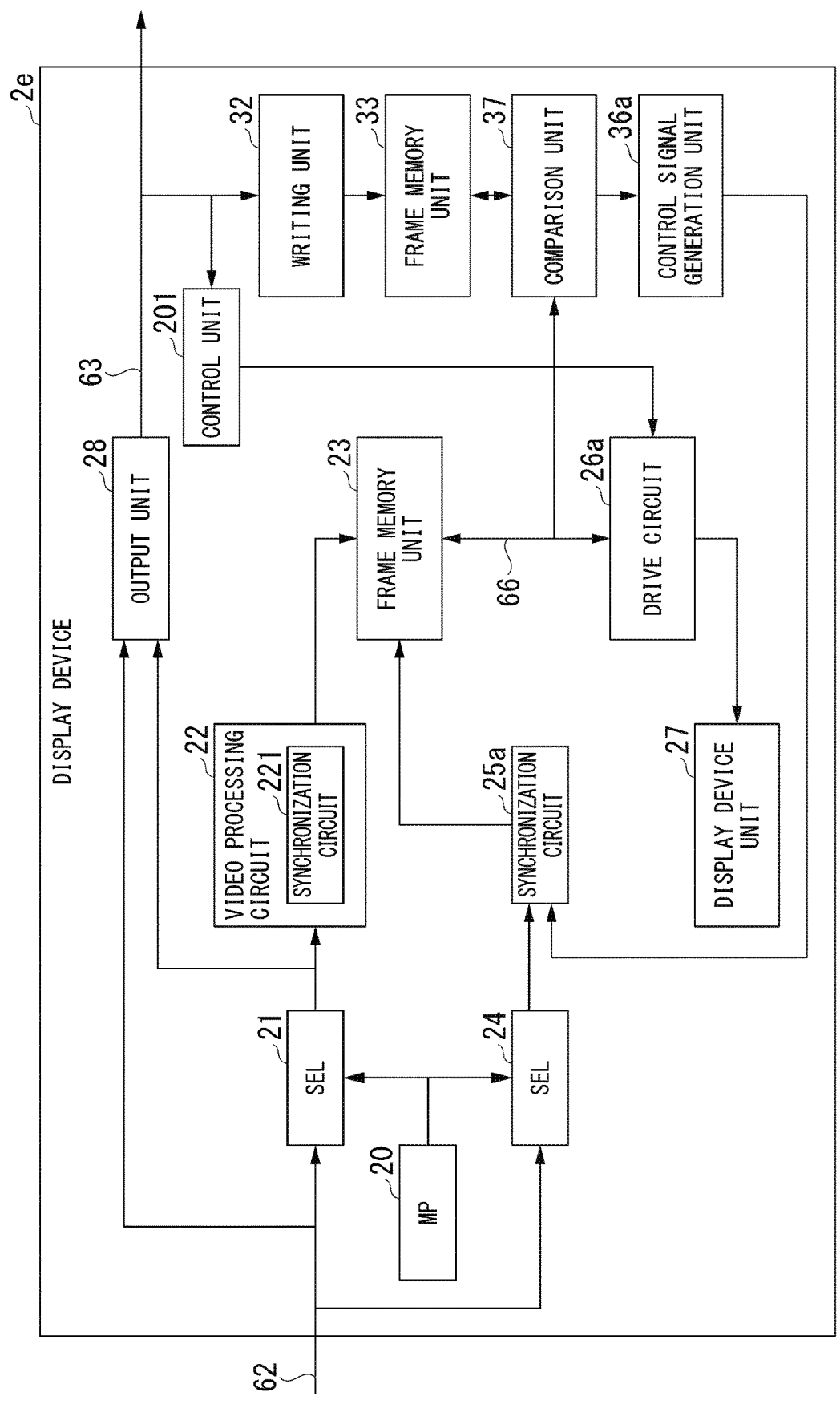
FIG. 16 is a schematic block diagram representing the functions of a display device 2e according to a sixth embodiment.

FIG. 16 is a schematic block diagram representing the functions of a display device 2e according to a sixth embodiment. This display device 2e has some parts that are the same as a portion of the display device 2d in the fifth embodiment. The parts that are the same will be assigned the same reference numbers and their explanations will be omitted.

A comparison unit 37 compares, frame by frame, a video signal read from the frame memory unit 23 and a video signal read from the frame memory unit 33. For example, the comparison unit 37 compares a frame of the video signal read from the frame memory unit 23 with a frame of the video signal read from the frame memory unit 33, and if there is no difference between the frames or the difference is a threshold value or less, then it is determined that the frames are the same. In this case, the video signals stored in the frame memory unit 23 and the frame memory unit 33 may be synchronizing video signals, which are test signals used for synchronization.

The control signal generation unit 36a generates a control signal for reading out a video signal stored in the frame memory unit 23 based on the comparison results from the comparison unit 37. For example, the control signal generation unit 36a generates a control signal for reading out a video signal when the comparison results from the comparison unit 37 indicate a match or that the difference is the threshold value or less.

The synchronization circuit 25a supplies the control signal generated by the control signal 36a to the frame memory unit 23. As a result thereof, the synchronization circuit 25a can cause a frame of a video signal, corresponding to the control signal generated by the control signal generation unit 36, to be read.

Additionally, if there is no frame in the frame memory unit 33 corresponding to the playback time of a frame in the frame memory unit 23, then the comparison unit 37 may perform the comparison by using, as the frame in the frame memory unit 33, a prescribed frame such that the difference becomes greater than the difference between frames when there is a frame in the frame memory unit 33 corresponding to the playback time of a frame in the frame memory unit 23. As the prescribed frame, for example, it is possible to use a frame in which black is displayed in the entire area (an all-black frame).

Additionally, if there is no frame in the frame memory unit 33 corresponding to the playback time of a frame in the frame memory unit 23, then the comparison unit 37 may detect that there is no corresponding frame, and may output information indicating a difference greater than the difference between frames when there is a frame in the frame memory unit 33 corresponding to the playback time of a frame in the frame memory unit 23.

Figure 17:
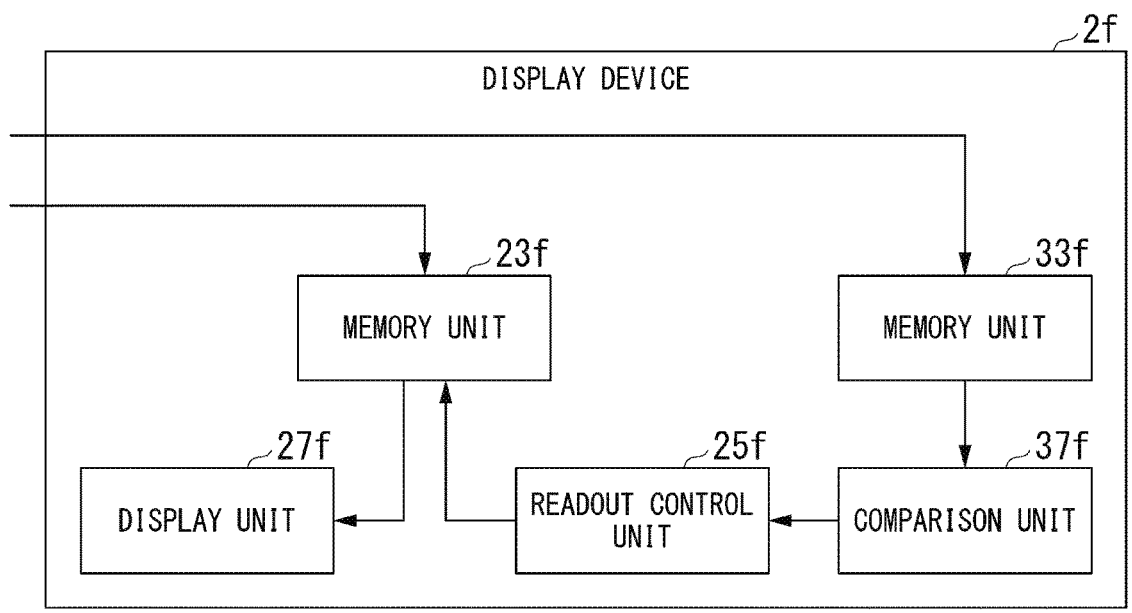
FIG. 17 is a schematic block diagram representing the functions of a display device 2f according to a seventh embodiment.

FIG. 17 is a schematic block diagram representing the functions of a display device 2f according to a seventh embodiment.

A memory unit 23f stores a video signal input from a video playback device. This video playback device may be connected externally with respect to the display device 2f.

A memory unit 33f stores a video signal that corresponds to the video playback device and that is a video signal input from a first display device, different from the own display device, among those in a multi-display system formed from multiple display devices.

A comparison unit 37f compares, frame by frame, the video signal read from the memory unit 23f and the video signal read from the memory unit 33f.

A readout control unit 25f causes the video signal input from the video playback device stored in the memory unit 23f to be read out on the basis of the comparison results in the comparison unit 37f.

A display unit 27f displays video of the video signal read out from the memory unit 23.

In the above-described embodiments, the case in which the MP in FIG. 1, FIG. 3, FIG. 4, FIG. 6, FIG. 9, FIG. 10 and FIG. 16, and the video playback unit in FIG. 7 and FIG. 8 are provided inside the video display devices was explained. However, these may be provided external to the display devices.

Additionally, a program for performing the functions of the display device in FIG. 3, FIG. 4, FIG. 6, FIG. 7 or FIG. 8 may be recorded on a computer-readable recording medium, and the display process may be performed by reading the program recorded on this recording medium into a computer system and executing the program. The "computer system" in this case includes an OS and hardware such as peripheral devices.

Additionally, if the "computer system" uses a www-based system, then it includes a webpage-presenting environment (or a display environment).

Additionally, the "computer-readable recording medium" refers to portable media such as flexible disks, magneto-optic disks, ROMs and CD-ROMs, and storage devices, such as hard disks, contained in computer systems. Furthermore, the "computer-readable recording medium" includes those that hold the program for a certain time, such as volatile memory inside a computer system serving as a server or a client. Additionally, the above-mentioned program may be for executing just some of the aforementioned functions, and furthermore, the aforementioned functions may be executed in combination with a program that is already recorded in a computer system. Additionally, the above-mentioned program may be stored on a prescribed server, and said program may be distributed (downloaded or the like) through a communication line in response to requests from other devices.

While embodiments of the present invention have been explained in detail with reference to the drawings above, the specific structure is not limited to these embodiments, and designs or the like not departing from the spirit of this invention are also included.

[Reference Signs List]

| | |
|---|---|
| 1, 1a, 1b, 1c, 2, 3, 4 | Display device |
| 5 | Signal source |
| 10, 20, 30, 40 | MP (media player) |
| 11, 14, 21, 24 | SEL (selector) |
| 12, 22 | Video processing circuit |
| 13, 23 | Frame memory unit |
| 13b, 13c | Memory unit |
| 14b | Acquisition unit |
| 15, 25, 35, 45 111 | Synchronization circuit |
| 15b, 15c | Readout control unit |
| 16, 26 | Drive circuit |
| 16b, 16c | Display control circuit |
| 17, 27 | Display device |
| 17b, 17c | Display unit |
| 18, 18, 28 | Output unit |
| 19 | RTC (real-time clock) |
| 32 | Writing unit |
| 33 | Frame memory unit |
| 34 | Difference computation unit |
| 35 | Summation unit |
| 36 | Control signal generation unit |
| 61, 62, 63, 64 | Video signal line |
| 201 | Control unit |

The invention claimed is:

1. A display device comprising:
a first video signal acquisition unit configured to acquire a first video signal from a first display device which is different from the display device, wherein the display device and the first display device are included in a plurality of display devices of a multi-display system;
a video playback device configured to playback video media, the video playback device configured to output a second video signal of the video media play-backed;
a first memory unit configured to store the second video signal output from the video playback device;
a readout control signal acquisition unit configured to acquire a readout control signal from the first display device, the readout control signal indicating a readout timing, the readout control signal being output with a period within one frame constituting the first video signal, based on the first video signal;
a readout control unit configured to cause the second video signal to be read out from the first memory unit in accordance with the readout timing; and
a display unit configured to display video based on the second video signal read out from the first memory unit.

2. The display device according to claim 1, further comprising:
an output unit configured to output the readout control signal to a second display device connected downstream of the display device,
wherein the second display device is included in the plurality of display devices of the multi-display system.

3. The display device according to claim 1, further comprising:
a second memory unit configured to store the first video signal input from the first display device; and
a comparison unit configured to compare, frame by frame, the second video signal read out from the first memory unit and the first video signal read out from the second memory unit,
wherein the readout control unit causes the video signal input from the video playback device stored in the first memory unit to be read out based on a comparison result in the comparison unit.

4. The display device according to claim 3, further comprising:
a display control circuit does not display, on the display unit, a frame used by a control signal generation unit to generate the readout control signal.

5. The display device according to claim 3, wherein a number of frames used to generate the readout control signal is within a predetermined number.

6. The display device according to claim 1, wherein the readout control signal is a vertical synchronization signal or a horizontal synchronization signal in a video signal displayed on the first display device.

7. The display device according to claim 1, wherein the first video signal is transmitted via a signal line daisy chaining multiple display devices in the multi-display system.

8. A display method for displaying video by a display device, wherein the display device and first display device are included in a plurality of display devices of a multi-display system, the method comprising:
acquiring a first video signal from a first display device which is different from the display device;
playbacking video media, to output a second video signal of the video media play-backed;
storing, into a first memory unit, the second video signal output from the video playback device;
acquiring a readout control signal from the first display device, the readout centroid signal indicating a readout timing, the readout control signal being output with a period within one frame constituting the first video signal, based on the first video signal;
causing the second video signal to be read out from the first memory unit in accordance with the readout timing; and
displaying, on a display unit, video based on the second video signal read out from the first memory unit.

9. The display method according to claim 8, further comprising:
outputting the readout control signal to a second display device connected downstream of the display device,
wherein the second display device is included in the plurality of display devices of the multi-display system.

10. The display method according to claim 8, further comprising:
storing, into a second memory unit, the first video signal input from the first display device; and
comparing, frame by frame, the second video signal read out from the first memory unit and the fit video signal read out from the second memory unit,
wherein, in the reading out the video signal, the video signal input from the video playback device stored in the first memory unit is read out based on a comparison result.

11. The display method according to claim 10, further comprising:
controlling not to display, on the display unit, a frame used to generate the readout control signal.

12. The display method according to claim 10, wherein a number of frames used to generate the readout control signal is within a predetermined number.

13. The display method according to claim 8, wherein the readout control signal includes a vertical synchronization signal or a horizontal synchronization signal in a video signal displayed on the first display device.

14. The display method according to claim 8, wherein the first video signal is transmitted via a signal line daisy chaining multiple display devices in the multi-display system.

15. A display method by a display device, the method comprising:
- acquiring a first video signal from a first display device which is different from the display device, wherein the display device and the first display device are included in a plurality of display devices of a multi-display system;
- play-backing video media to output a second video signal of the video media pay-backed;
- storing, into a first memory unit, the second video signal output from the video playback device;
- storing, into a second memory unit, the first video signal corresponding to the video playback device, the first video signal being input from the first display device different from the display device in the multi-display system;
- comparing, frame by frame, the second video signal read out from the first memory unit and the first video signal read out from the second memory unit;
- causing the second video signal input from the video playback device stored in the first memory unit to be read out based on a comparison result; and
- displaying, on a display unit, video based on the second video signal read out from the first memory unit.

16. The display method according to claim 15, further comprising:
- outputting the readout control signal to a display device connected downstream.

17. The display method according to claim 15, further comprising:
- controlling not to display, on the display unit, a frame used to generate the readout control signal.

18. The display method according to claim 15, wherein a number of frames used to generate the readout control signal is within a predetermined number.

19. The display method according to claim 15, wherein the readout control signal is a vertical synchronization signal or a horizontal synchronization signal in a video signal displayed on the first display device.

20. The display method according to claim 15, wherein the first video signal is transmitted via a signal line daisy chaining multiple display devices in the multi-display system.

* * * * *